(12) United States Patent
Kanouda et al.

(10) Patent No.: US 7,059,184 B2
(45) Date of Patent: Jun. 13, 2006

(54) SPLIT-FLOW-TYPE FLOW SENSOR DEVICE

(75) Inventors: Souhei Kanouda, Osaka (JP); Susumu Takayanagi, Osaka (JP); Kiyoshi Hama, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 11/059,471

(22) Filed: Feb. 16, 2005

(65) Prior Publication Data

US 2005/0183500 A1    Aug. 25, 2005

(30) Foreign Application Priority Data

Feb. 19, 2004 (JP) .......................... P. 2004-043724
Apr. 6, 2004 (JP) .......................... P. 2004-112536

(51) Int. Cl.
*G01F 1/68* (2006.01)

(52) U.S. Cl. .................................... 73/202.5

(58) Field of Classification Search ............... 73/202.5, 73/202, 204.11, 204.21, 118.2

See application file for complete search history.

(56) References Cited

U.S. PATENT DOCUMENTS 5,014,552 A    5/1991   Kamiunten et al.
5,167,147 A *  12/1992  Peters et al. ................ 73/118.2
5,672,821 A *   9/1997  Suzuki ......................... 73/202
6,655,207 B1* 12/2003  Speldrich et al. ........... 73/202.5
6,886,401 B1*  5/2005  Ito et al. ....................... 73/202

FOREIGN PATENT DOCUMENTS

JP              6-43907 B      6/1994
JP         2003-329504 A      11/2003

* cited by examiner

*Primary Examiner*—Edward Lefkowitz
*Assistant Examiner*—Corey D. Mack
(74) *Attorney, Agent, or Firm*—Smith Patent Office

(57) ABSTRACT

A split-flow-type flow sensor apparatus includes a main flow passage and a bypass flow passage, wherein a thermal flow sensor is placed on the wall face of the bypass flow passage. A first rectification member is placed upstream from a diversion part to the bypass flow passage in the main flow passage, and a second rectification member is placed upstream from the thermal flow sensor in the bypass flow passage. A bypass flow passage module is inserted into an opening formed on a side of a main flow passage module. The side opening of the main flow passage module is sealed and an entrance and an exit of the bypass flow passage are positioned in the main flow passage.

20 Claims, 16 Drawing Sheets

SPLIT-FLOW-TYPE FLOW SENSOR DEVICE

This application claims foreign priority based on Japanese patent application JP 2004-043724, filed on Feb. 19, 2004 and Japanese patent application JP 2004-112536, filed on Apr. 6, 2004, the contents of which are incorporated herein by reference in its entirety.

BACKGROUND OF THE INVENTION

1. Field of the Invention

This invention relates to a split-flow-type flow sensor apparatus including a main flow passage and a bypass flow passage with a thermal flow sensor placed on the wall face of the bypass flow passage.

2. Description of the Related Art

Flow sensors for measuring the flow quantity of gas include a sensor called a thermal flow sensor. With the sensor, a resistor such as a platinum wire is exposed to a gas flow and the degree of cooling heat produced when an electric current is allowed to flow into the resistor by the gas flow is detected, whereby the gas flow quantity is measured.

In recent years, a small thermal flow sensor formed with a platinum thin film on a silicon chip several millimeters square using a processing technique called MEMS (Micro Electro Mechanical System) has been developed for use with the development of semiconductor manufacturing technology. A flow sensor apparatus wherein such a thermal flow sensor is attached to the inner wall of a flow passage and is integral with a squeezing section and a rectification section is commercially practical. (For example, refer to JP-B-6-43907) The flow sensor apparatus is inserted into a midpoint in piping of gas in an apparatus or a facility wherein the flow quantity is to be measured for use.

In the flow sensor apparatus using the small thermal flow sensor as described above, if the flow quantity of gas increases, the gas flow in the flow passage tends to be disordered and the measurement accuracy tends to be degraded. Then, the gas flow passage is separated into a main flow passage and a bypass flow passage and a thermal flow sensor is placed on the wall face of the bypass flow passage for estimating the whole flow quantity from the partial quantity of flow through the bypass flow passage. This means that the whole flow quantity is estimated from the separation ratio between the main flow passage and the bypass flow passage. If the separation ratio is changed, the range of flow quantity that can be measured can be changed.

A flow sensor apparatus having a main flow passage and a bypass flow passage in one piece is also developed. (For example, refer to JP-A-2003-329504) Such a flow sensor apparatus including a main flow passage and a bypass flow passage and having a thermal flow sensor placed on the wall face of the bypass flow passage is called a split-flow-type flow sensor apparatus. In the flow sensor apparatus disclosed in patent document 2, the bypass flow passage is called sensor flow passage and the main flow passage is called bypass flow passage.

To enhance the measurement accuracy of the split-flow-type flow sensor apparatus as mentioned above and provide stable measurement output, it is important to smooth the flow of gas in the main flow passage and the bypass flow passage for minimizing disorder of the gas flow. Particularly, it is important to minimize disorder of the gas flow on the periphery of the thermal flow sensor in the bypass passage. On the other hand, it is also necessary to meet the demands for miniaturizing the split-flow-type flow sensor apparatus and reducing the cost thereof.

SUMMARY OF THE INVENTION

It is therefore an object of the invention to provide a split-flow-type flow sensor apparatus having a new structure for making possible miniaturization and cost reduction while maintaining high measurement accuracy and measurement stability.

As a first configuration according to the invention, a split-flow-type flow sensor apparatus includes a main flow passage, a bypass flow passage with a thermal flow sensor placed on the wall face of the bypass flow passage and a first rectification member placed upstream from a diversion part to the bypass flow passage in the main flow passage. Further, the split-flow-type flow sensor apparatus may include a second rectification member placed upstream from the thermal flow sensor in the bypass flow passage. The first and/or second rectification member may have a plurality of mesh plates or porous plates put on the top of each other with a predetermined spacing. Alternatively, a tube shaped like a honeycomb in cross section maybe adopted as the first and/or second rectification member.

A second configuration of the split-flow-type flow sensor apparatus according to the invention is characterized in that in the first configuration, the split-flow-type flow sensor apparatus includes a main flow passage module formed with the main flow passage containing the first rectification member and a bypass flow passage module formed with the bypass flow passage containing the second rectification member, wherein the bypass flow passage module is inserted into an opening formed on a side of the main flow passage module, and the opening is sealed and an entrance and an exit of the bypass flow passage are positioned in the main flow passage.

A third configuration of the split-flow-type flow sensor apparatus according to the invention is characterized in that in the first or second configuration, the entrance of the bypass flow passage is positioned roughly at the center of the cross section of the main flow passage.

A fourth configuration of the split-flow-type flow sensor apparatus according to the invention is characterized in that in the first, second, or third configuration, the tip of the bypass flow passage module forming the entrance of the bypass flow passage projects upstream of the main flow passage.

A fifth configuration of the split-flow-type flow sensor apparatus according to the invention is characterized in that in any one of the first to fourth configurations, the second rectification member has a plurality of mesh plates arranged in a longitudinal direction of the second rectification member, each of the mesh plates is made up of a mesh part where meshes (or a large number of small holes) are formed and a plate part where no meshes are formed, and the mesh part is formed thinner than the plate part so that a given gap is formed between the mesh parts of the adjacent mesh plates.

The first configuration of the invention makes it possible to miniaturize a split-flow-type flow sensor apparatus while maintaining high measurement accuracy and measurement stability. The first rectification member has a function of mainly uniforming the radial flow distribution in the main flow passage before diversion, namely, the flow distribution in the cross section of the flow passage. Particularly, if the shape of the pipe line on the upstream side of the split-flow-type flow sensor apparatus is not linear and is bent (for example, bent like a letter L) or if the diameter of the pipe line changes, deflection of gas flow (drift) easily occurs, in which case the effect of the first rectification member is large. The second rectification member has a function of performing rectification upstream from the thermal flow sensor in the bypass flow passage and suppressing gas flow disorder in the proximity of the thermal flow sensor. Particularly, if the gas flow velocity is high or the cross section of the bypass flow passage is large, the effect of the second rectification member is large.

According to the second configuration of the invention, the bypass flow passage is provided by one module, whereby assembling the split-flow-type flow sensor apparatus is facilitated, contributing to cost reduction of the apparatus. Maintainability of the apparatus is also improved.

According to the third configuration of the invention, the entrance of the bypass flow passage is positioned roughly at the center of the cross section of the main flow passage. Therefore, gas at the center where comparatively stable gas flow occurs rather than in the vicinity of the wall face of the pipe line where the effect of gas flow disorder or drift is easily received can be introduced into the bypass flow passage. Consequently, the flow quantity of gas flowing through the bypass flow passage easily becomes stable and the stability of flow measurement of the thermal flow sensor is improved.

According to the fourth configuration of the invention, the tip of the bypass flow passage module forming the entrance of the bypass flow passage projects upstream of the main flow passage. Therefore, gas flow disorder in the main flow passage caused by the peripheral part of the entrance of the bypass flow passage placed in the main flow passage is decreased. If the gas flow in the main flow passage is disordered, the gas flow in the bypass flow passage in which the thermal flow sensor is placed is also disordered. Thus, it is important to suppress gas flow disorder in the main flow passage.

According to the fifth configuration of the invention, the second rectification member includes a plurality of mesh plates that can be placed in a short space in the flow passage direction can be formed. The rectification effect is enhanced by the plurality of mesh parts put on the top of each other with a given gap. In the bypass flow passage module formed comparatively small, it is difficult to provide a long space in the flow passage direction upstream from the thermal flow sensor and therefore such a structure is appropriate for the second rectification member. Since a plurality of mesh plates need only to be put on the top of each other without the intervention of a spacer, it becomes easy to assemble the apparatus.

DETAILED DESCRIPTION OF THE INVENTION

Referring now to the accompanying drawings, there are shown preferred embodiments of the invention.

Figure 12:
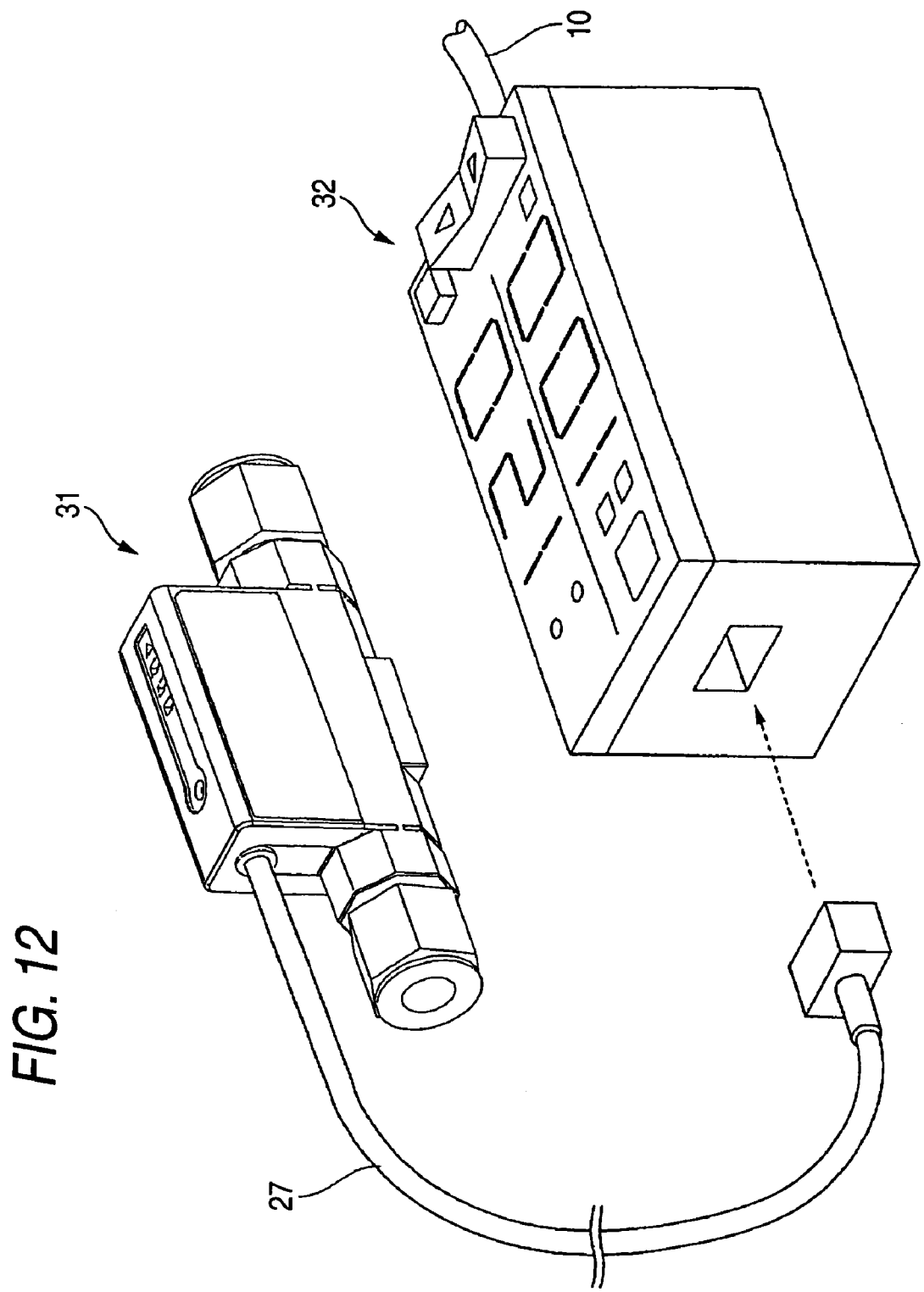
FIG. 12 is an external view to show the whole configuration of the split-flow-type flow sensor apparatus according to the embodiment of the invention.

FIG. 12 is an external view to show the whole configuration of a split-flow-type flow sensor apparatus according to an embodiment of the invention. The split-flow-type flow sensor apparatus of the embodiment includes a head section 31 and an amplification section 32 which are connected by an electric cable 27. The amplification section 32 can be further connected to an external machine (not shown) via an electric cable 10.

Figure 1:
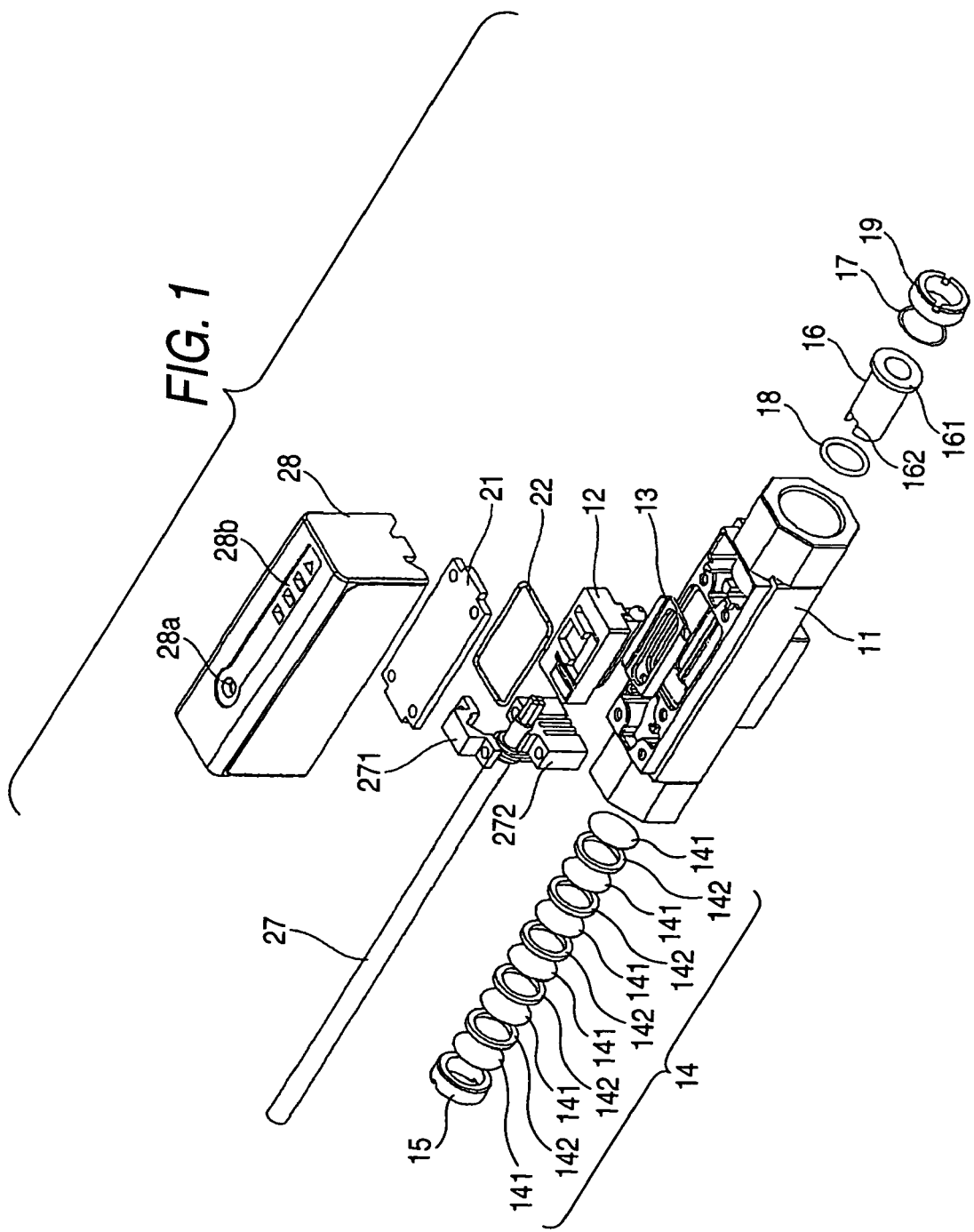
FIG. 1 is an exploded view of a head section of a split-flow-type flow sensor apparatus according to an embodiment of the invention.
Figure 2:
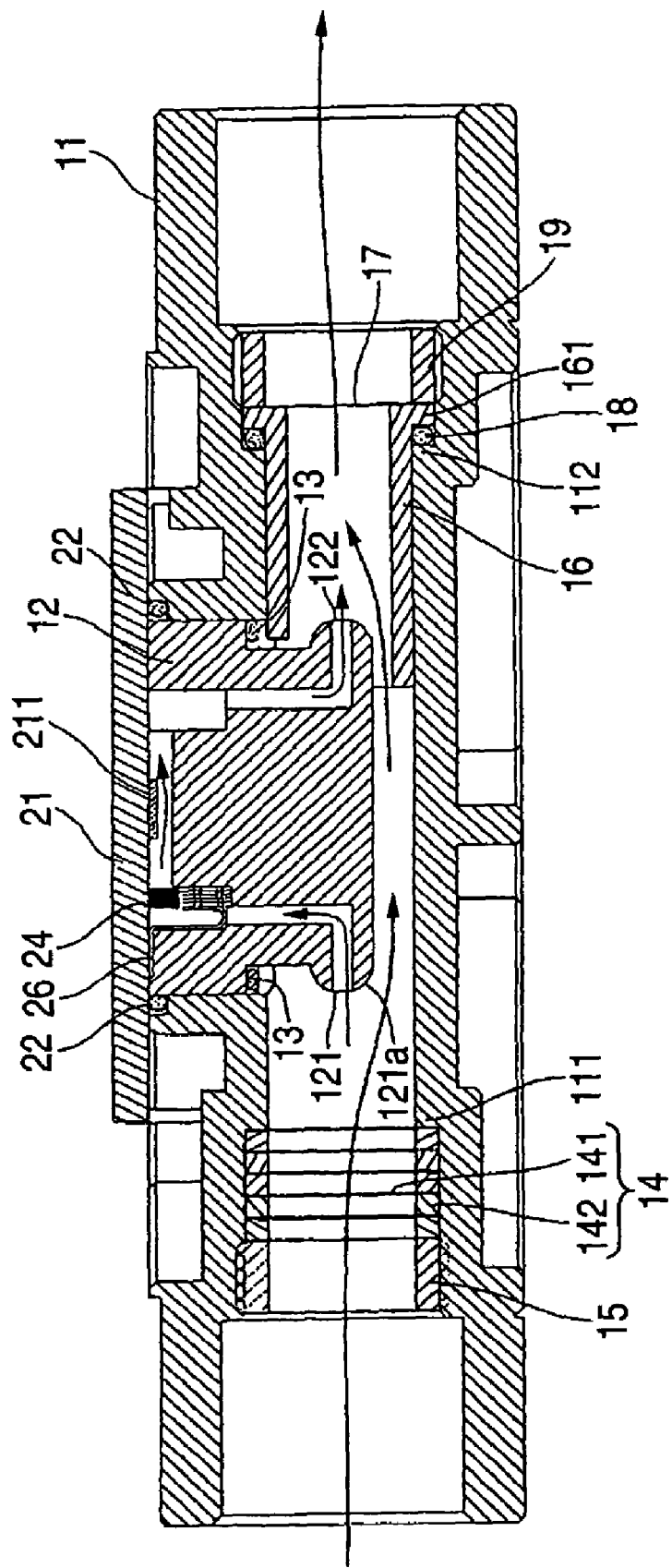
FIG. 2 is a sectional view of the main part of the head section of the split-flow-type flow sensor apparatus.
Figure 13:
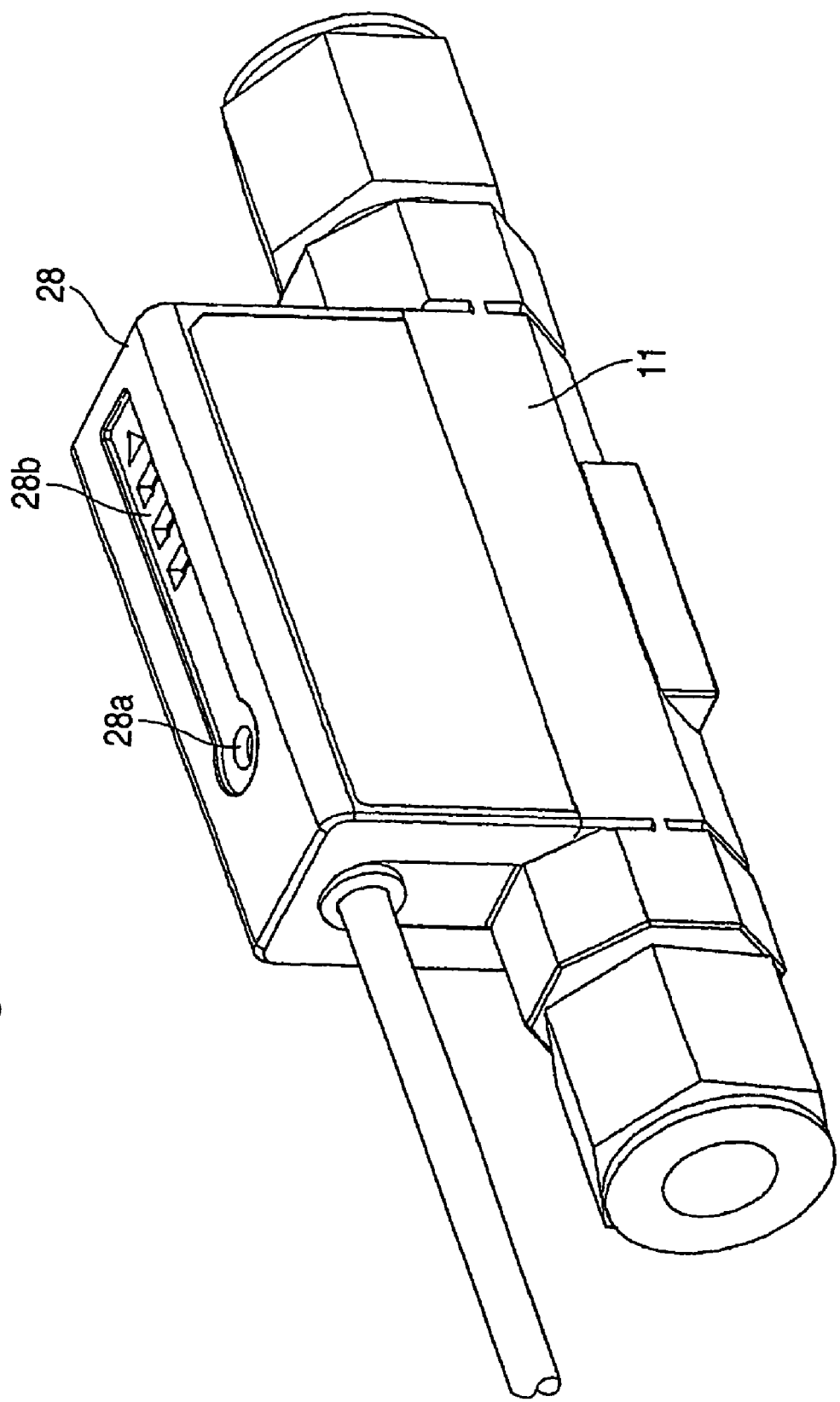
FIG. 13 is an external view to show the appearance of the head section of the split-flow-type flow sensor apparatus according to the embodiment of the invention.

FIG. 13 is an external view to show the appearance of the head section of the split-flow-type flow sensor apparatus according to the embodiment of the invention. FIG. 1 is an exploded view of the head section of the split-flow-type flow sensor apparatus, and FIG. 2 is a sectional view of the main part of the head section of the split-flow-type flow sensor apparatus. The split-flow-type flow sensor apparatus includes a main flow passage member (main flow passage module) 11 made of metal and shaped roughly like a cylinder and a bypass flow passage module inserted into an opening formed on a side of the main flow passage member (the top face in FIG. 1, etc.,). The bypass flow passage module is made up of a bypass flow passage member 12 made of metal or resin and a flow sensor board 21. Bypass packing 13 is interposed between the side opening of the main flow passage member 11 and the bypass flow passage member 12. Board packing 22 seals the side opening of the main flow passage member 11 (main flow passage module) and the bypass flow passage module (ensures hermeticity) although described later in detail.

To use the split-flow-type flow sensor apparatus, both end parts of the main flow passage member 11 shaped roughly like a cylinder are inserted into a pipeline of gas in an apparatus or a facility wherein the flow quantity is to be measured. The main flow passage member (main flow passage module) 11 forms the main flow passage of gas and the bypass flow passage module (bypass flow passage member 12 and flow sensor board 21) forms a bypass flow passage of gas diverted from the main flow passage. In FIG. 2, the state in which gas flows through the main flow passage is indicated by the solid arrow line, and the state in which gas flows through the bypass flow passage is indicated by the thin arrow line.

A first rectification member 14 having alternating layers of mesh plates 141 and spacers 142 is placed in an upstream portion of the main flow passage member 11. In the example shown in the figure, six mesh plates 141 and five spacers 142 are alternately put on top of each other, making up the first rectification member 14. By way of example, each mesh plate 141 is a disk-like metal plate 0.1 mm in thickness formed with a large number of small holes each about 0.2 mm in diameter, and each spacer 142 is an annular member made of metal 1.0 mm in thickness.

The first rectification member 14 is pressed against a step part 111 provided on the upstream inner wall face of the main flow passage member 11 and is fixed using a mesh lock 15, as shown in FIG. 2. The mesh lock 15 is formed with an external thread on the outer periphery of an annular member, and is screwed into an internal thread formed on the inner wall face upstream from the step part 111 of the main flow passage member 11. The first rectification member 14 has a function of uniforming the radial flow distribution in the main flow passage before diversion, namely, the flow distribution in the cross section of the flow passage. The function is described later in detail.

A measurement range adjustment member 16 and a mesh filter 17 are placed in a downstream portion of the main flow passage member 11. The measurement range adjustment member 16 is a member shaped roughly like a cylinder and has a collar part 161 on one end side. The collar part of the measurement range adjustment member 16 is pressed against a step part 112 formed on the downstream inner wall face of the main flow passage member 11 so as to sandwich an O ring 18 therebetween. The cylindrical portion of the measurement range adjustment member 16 is inserted into the downstream cylindrical portion of the main flow passage member 11, as shown in FIG. 2. It is desirable that the outer diameter of the cylindrical portion of the measurement range adjustment member 16 and the inner diameter of the downstream cylindrical portion of the main flow passage member 11 should be almost equal to each other and the gap therebetween should be small as much as possible.

A mesh lock 19 is screwed into the outer end face of the collar part 161 of the measurement range adjustment member 16 so as to sandwich the outer peripheral portion of the mesh filter 17, whereby the measurement range adjustment member 16 and the mesh filter 17 are fixed. Like the mesh lock 15 described above, the mesh lock 19 is formed with an external thread on the outer periphery of an annular member, and is screwed into an internal thread formed on the inner wall face downstream from the step part 112 of the main flow passage member 11.

The mesh filter 17 is provided for preventing foreign material (dust) in gas from entering the inside of the split-flow-type flow sensor apparatus when gas flows backward from the downstream pipeline. The measurement range adjustment member 16 is used to facilitate changing the measurement range by changing the cross-sectional area of the main flow passage. Therefore, the measurement range adjustment member 16 may or may not be placed.

Figure 3:
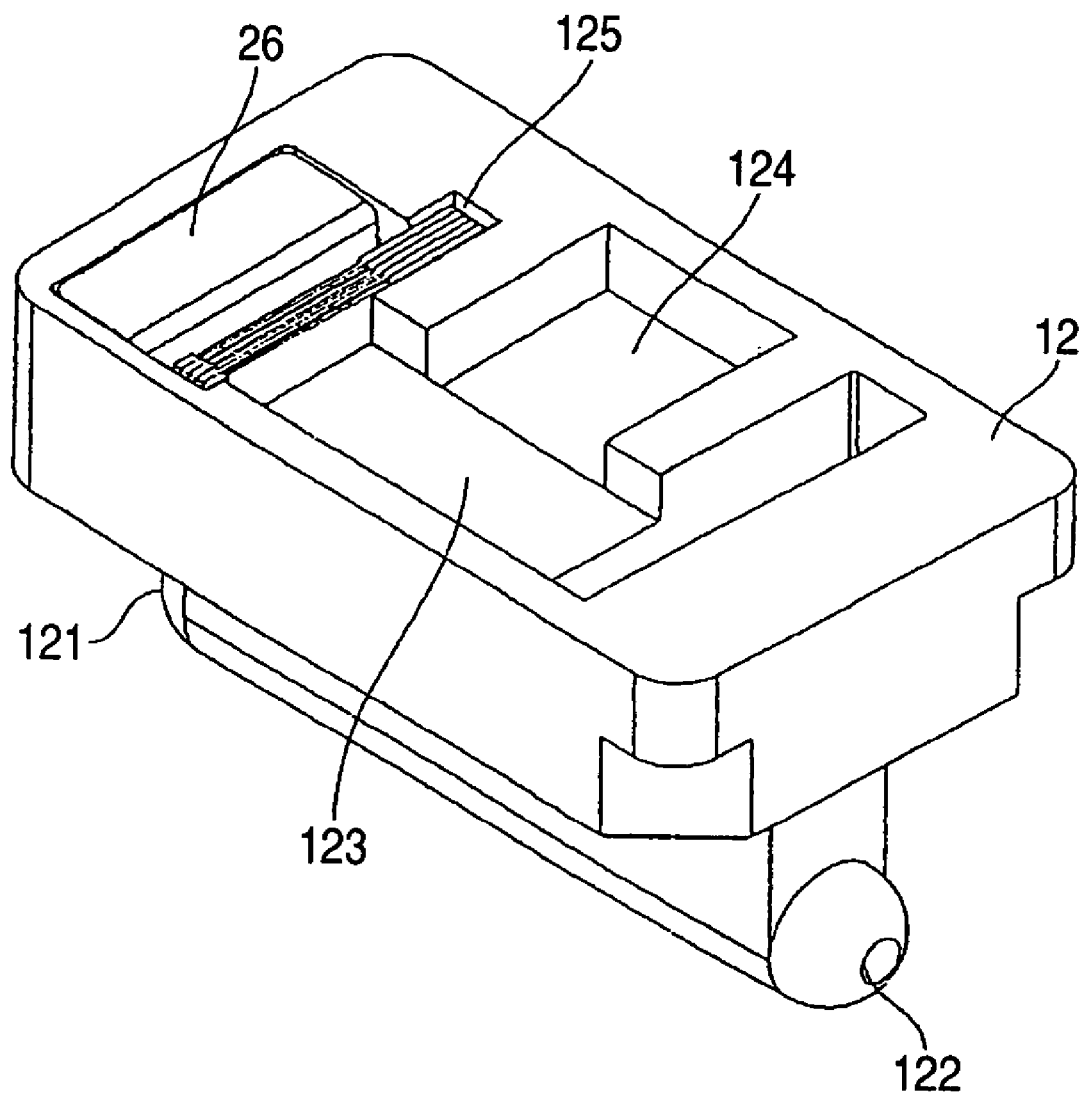
FIG. 3 is a perspective view of a bypass flow passage member.
Figure 4:
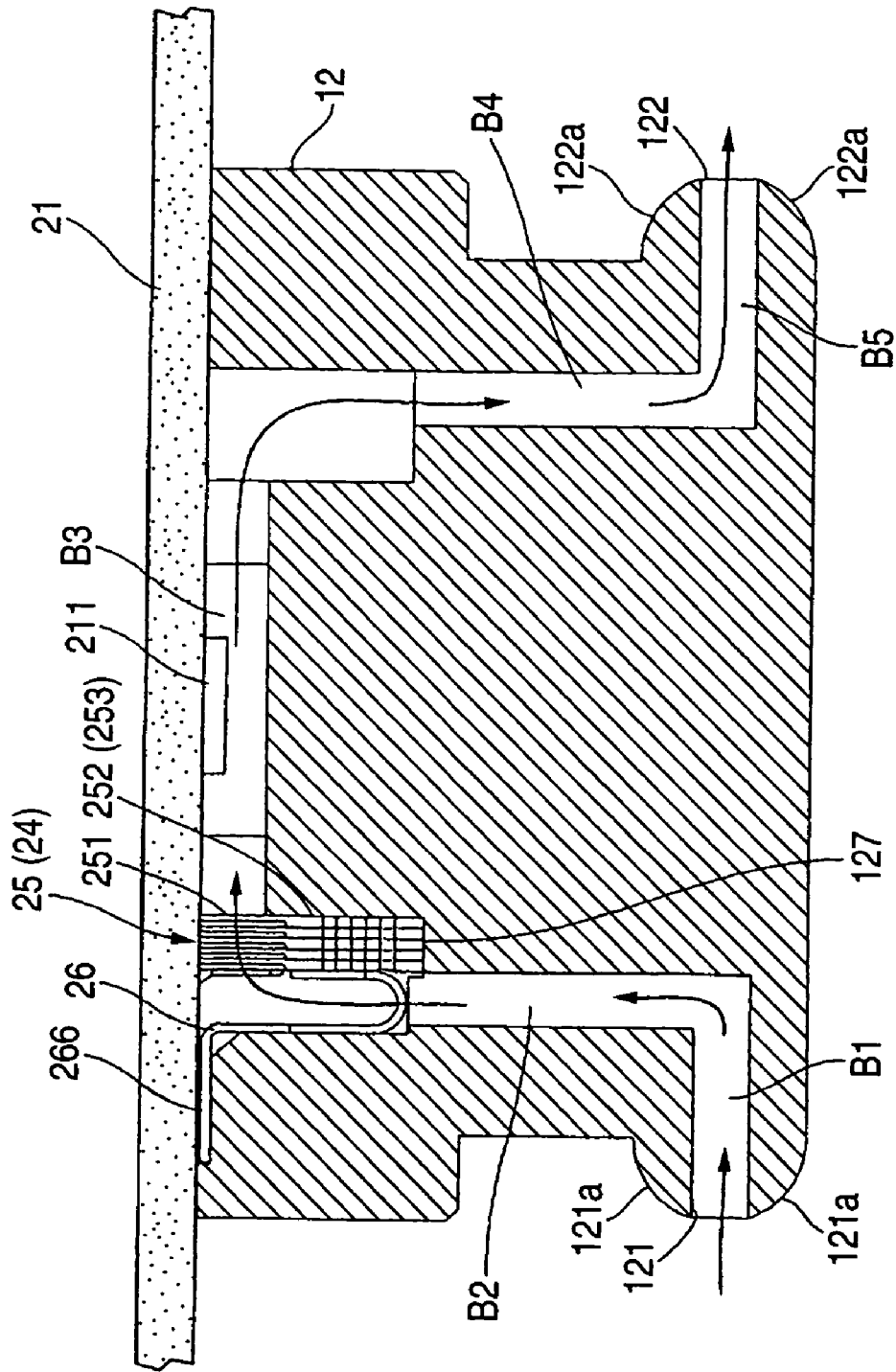
FIG. 4 is a sectional view of a bypass flow passage module made up of the bypass flow passage member and a flow sensor board.

FIG. 3 is a perspective view of the bypass flow passage member 12. FIG. 4 is a sectional view of the bypass flow passage module made up of the bypass flow passage member 12 and the flow sensor board 21. The bypass flow passage member 12 includes an entrance 121 and an exit 122 of the bypass flow passage positioned roughly at the center of the cross section of the main flow passage when the bypass flow passage member 12 is placed so as to seal the side opening of the main flow passage member 11. The bypass flow passage from the entrance 121 to the exit 122 is formed in the bypass flow passage member 12. In FIG. 4, the state in which gas flows through the bypass flow passage is indicated by the arrow line.

As seen in FIGS. 3 and 4, a recess part 123 is formed on the top face of the bypass flow passage member 12 and the front and back of the recess part 123 communicate with the entrance 121 and the exit 122. As shown in FIGS. 1 and 2, the flow sensor board 21 is put on the top face of the bypass flow passage member 12 and is fixed to the main flow passage member 11 with the board packing 22 between. This means that the recess part 123 of the bypass flow passage member 12 and the flow sensor board 21 blocking the upper opening of the recess form a part of the bypass flow passage.

Figure 5:
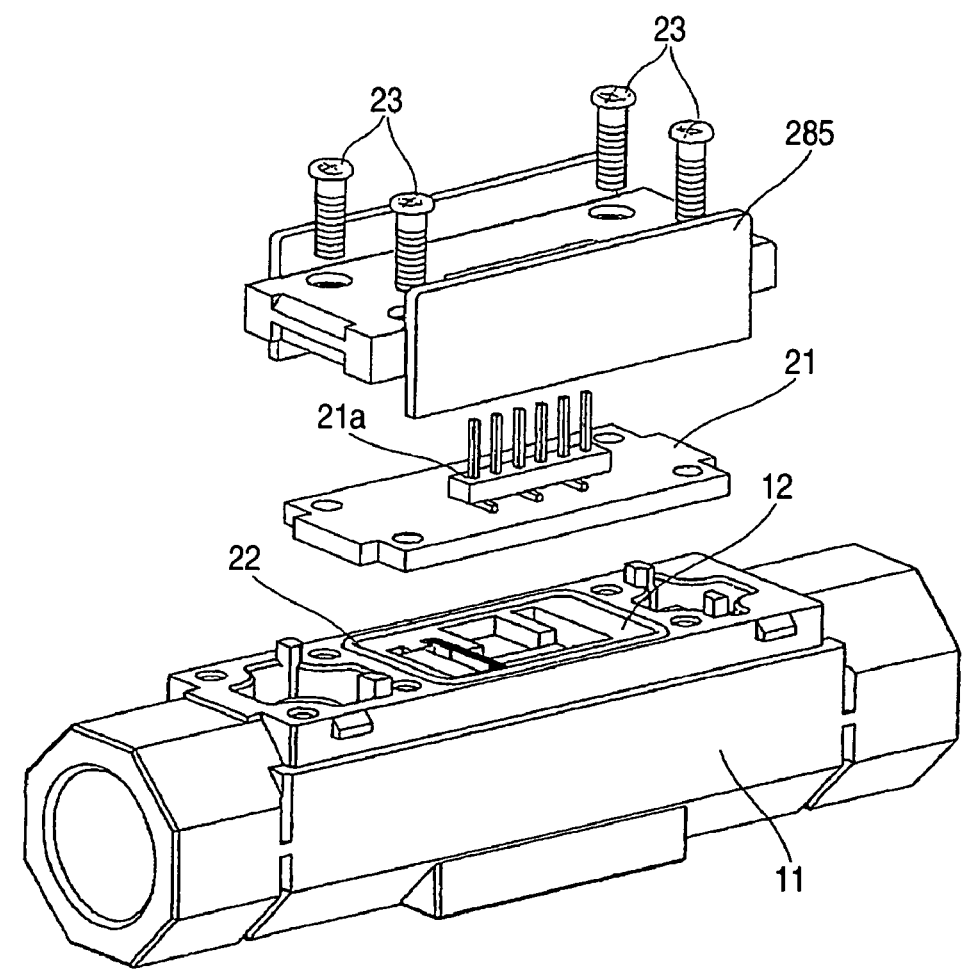
FIG. 5 is a perspective view to show a state in which the bypass flow passage module is placed in a side opening of a main flow passage module and a flow sensor board is put on the top of the bypass flow passage module.

FIG. 5 is a perspective view to show a state in which the bypass flow passage member 12 is placed in the side opening of the main flow passage member 11 and the flow sensor board 21 is put on the top of the bypass flow passage member 12. The board packing 22 is fitted into a groove formed by a step part provided in the surrounding of the side (top) opening of the main flow passage member 11 and the outer peripheral surface of the upper end part of the bypass flow passage member 12, as well shown in the sectional view of FIG. 2. When the flow sensor board 21 is fastened to the top face of the main flow passage member 11 by four fixing screws 23 and a lower board holder 285, the board packing 22 becomes deformed and the side opening of the main flow passage member 11, the side of the bypass flow passage member 12, and the lower face of the flow sensor board 21 are sealed at the same time. The attachment structure of the flow sensor board 21, etc., is additionally described later.

As shown in FIGS. 2 and 4, a thermal flow sensor 211 of a chip part is installed on the lower face of the flow sensor board 21. This means that the thermal flow sensor 211 is placed on the lower face of the flow sensor board 21 forming a part of the wall face of the bypass flow passage. In FIG. 3, a second recess part 124 is formed by the side of the recess part 123 forming a part of the bypass flow passage for avoiding a mold part for protecting a lead (wire) of the thermal flow sensor 211 installed on the lower face of the flow sensor board 21. To use a thermal flow sensor not including such a mold part, the recess part 124 is not required and the recess part 123 forming a part of the bypass flow passage need not be displaced from the center in a direction (width direction) at right angles to the flow passage direction. The dimension in the width direction can be also be further lessened.

The entrance 121 of the bypass flow passage is positioned roughly at the center of the cross section of the main flow passage as previously described with reference to FIG. 2. Accordingly, the gas at the center becoming a comparatively stable gas flow rather than in the vicinity of the wall face of the pipe line where disorder of gas flow easily occurs can be introduced into the bypass flow passage from the entrance 121 of the bypass flow passage. Consequently, the flow quantity of gas flowing through the bypass flow passage becomes easily stable and the flow measurement stability of the thermal flow sensor 211 is improved.

As seen in FIGS. 2 and 4, the tip of the bypass flow passage member 12 forming the entrance 121 of the bypass flow passage projects upstream and a peripheral part 121a of the entrance 121 is formed like a spherical surface. This means that it is formed so as to become a streamline shape along (the gas flow) in the main flow passage. Accordingly, gas flow disorder in the main flow passage caused by the peripheral part 121a of the entrance 121 of the bypass flow passage placed in the main flow passage is decreased. If the gas flow in the main flow passage is disordered, the gas flow in the bypass flow passage where the thermal flow sensor 211 is placed is adversely affected and therefore it is important to suppress gas flow disorder in the main flow passage. For a similar reason, the rear end part of the bypass flow passage member 12 forming the exit 122 of the bypass flow passage projects downstream and a peripheral part 122a of the exit 122 is also formed like a spherical surface (streamline shape).

A second rectification member 24 is placed upstream from the thermal flow sensor 211 at a midpoint in the bypass flow passage, as well shown in FIGS. 2 and 4. The second rectification member 24 has a plurality of (in the example, five) metal mesh plates 25 put on the top of each other, and each mesh plate 25 is made up of a mesh part 251 where meshes (a large number of small holes) are formed and a plate part 252 where no meshes are formed (see FIG. 6). The mesh part 251 is formed thinner than the plate part 252. Accordingly, a given gap is formed between the mesh parts 251 of the adjacent mesh plates 25.

By way of example, the thickness of the plate part 252 is 0.2 mm, the thickness of the mesh part 251 is 0.1 mm, and a 0.1-mm gap is formed between the mesh parts 251 of the adjacent mesh plates 25. The mesh plate 25 in the embodiment is an etching mesh plate having the mesh part 251 subjected to accurate working by etching. The mesh plate 25 may be formed using a wire net, a filter material, a honeycomb material, etc., but the etching mesh is excellent in that the rectification effect difference caused by variations at the assembling time is hard to occur.

Figure 6:
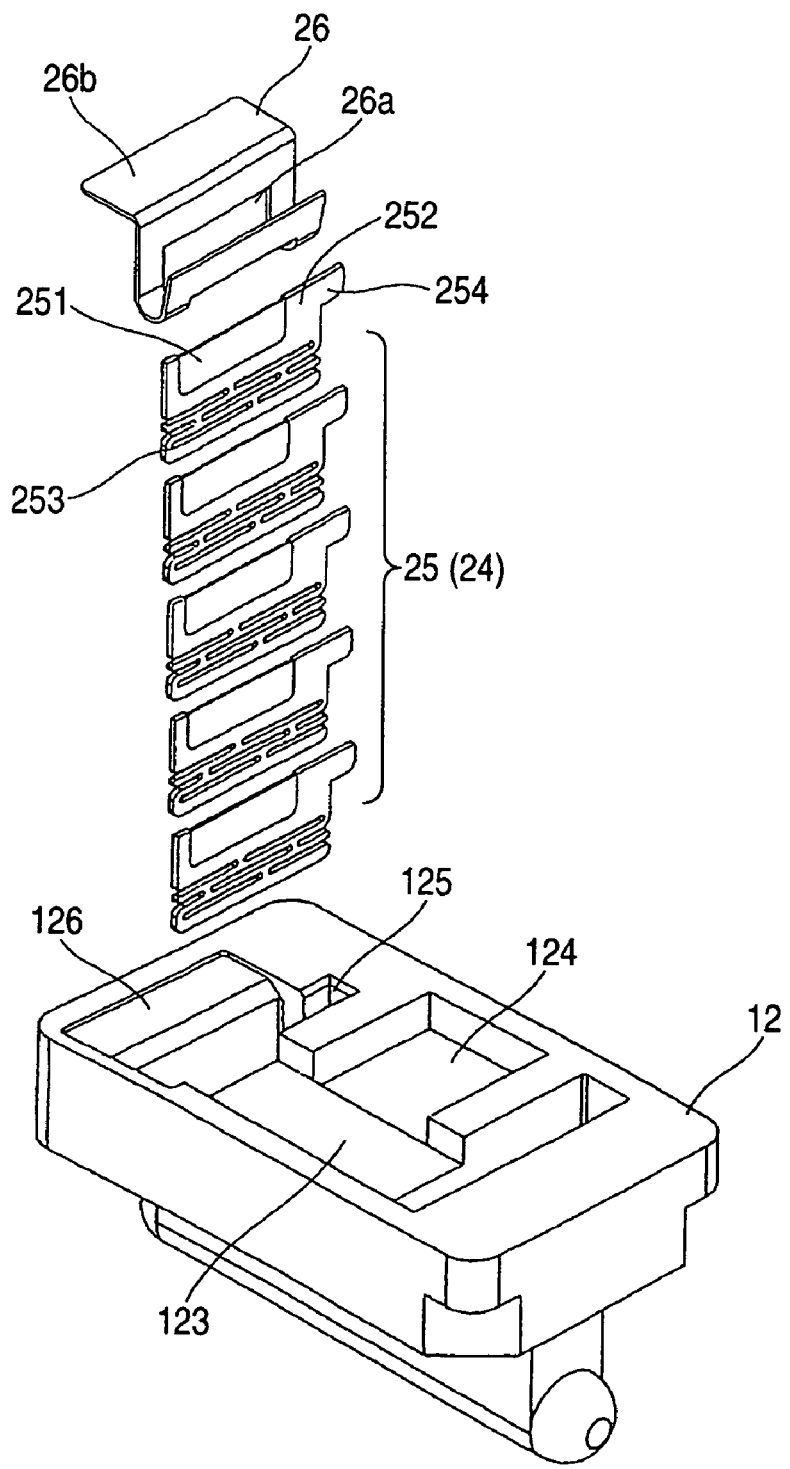
FIG. 6 is an exploded view of the bypass flow passage member 12 and a second rectification member.

FIG. 6 is an exploded view of the bypass flow passage member 12 and the second rectification member 24. As well shown in the figure, each of the five mesh plates 25 making up the second rectification member 24 is made up of the upper thin mesh part 251 and the thick plate part 252. The plate part 252 is formed in a lower portion 253 with three rows of horizontally oriented slits in a staggered configuration, whereby deformation (compression) in an up and down direction is made possible. The mesh part 251 is formed in one side portion with a projection 254 of a part of the plate part 252.

In FIG. 6, a mesh housing groove 125 is formed on the top face of the bypass flow passage member 12, and the five mesh plates 25 put on the top of each other are placed so that the projections 254 are fitted into the mesh housing groove 125. The five mesh plates 25 are pressed in the overlay direction and are fixed using a mesh presser bar spring 26 formed by working a sheet spring member. As seen in FIG. 4, the mesh presser bar spring 26 is positioned in the bypass flow passage and thus a large opening 26a at the center of the lower face of the mesh presser bar spring 26 is formed for allowing gas to flow. A shallow recess part 126 is formed upstream on the top face of the bypass flow passage member 12, and a horizontal portion 26b of the mesh presser bar spring 26 is fitted into the recess part 126.

When the flow sensor board 21 is fastened to the top face of the main flow passage member 11 as described above, the horizontal portion 26b of the mesh presser bar spring 26 is sandwiched between the recess part 126 on the top face of the bypass flow passage member 12 and the lower face of the flow sensor board 21 and is fixed, and the upper end faces of the five mesh plates 25 abut the lower face of the flow sensor board 21 and are pressed downward. At this time, the structure of allowing deformation (compression) in the up and down direction by the horizontally oriented slits provided in the lower portion 253 of each mesh plate 25 functions as described above.

That is, the lower end face of each mesh plate 25 abuts a step part 127 (see FIG. 4) formed in the bypass flow passage member 12, and the upper end face abuts the lower face of the flow sensor board 21. As the flow sensor board 21 is fastened to the top face of the main flow passage member 11 with the four fixing screws 23, each mesh plate 25 is a little compressed in the up and down direction. Such a structure is adopted, whereby each mesh plate 25 (second rectification member 24) is reliably fixed without looseness. As seen in FIGS. 2 and 4, the mesh part 251 of the upper portion of each mesh plate 25 is positioned in the bypass flow passage and the lower portion 253 is placed out of the bypass flow passage.

The second rectification member 24 has a function of further performing rectification upstream from the thermal flow sensor 211 in the bypass flow passage and suppressing gas flow disorder in the proximity of the thermal flow sensor 211. The function is described later in detail. The second rectification member 24 with the length (thickness) in the flow passage direction made as small as possible while a sufficient rectification function is provided is realized by the structure wherein a gap is provided between the adjacent mesh portions while the mesh plates 25 are put directly on the top of each other without the intervention of a spacer as described above. Unlike the first rectification member 14 in the main flow passage wherein a comparatively long space can be provided in the flow passage direction, preferably the second rectification member 24 placed upstream from the thermal flow sensor 211 is short in the flow passage direction. Accordingly, it is made possible to miniaturize the bypass flow passage member 12, and by extension the whole split-flow-type flow sensor apparatus.

The electric cable 27 for electrically connecting the head section and the amplification section of the split-flow-type flow sensor apparatus is fixed to the top face of the main flow passage member 11 using upper and lower cable bushes 271 and 272 and two fixing screws (not shown), as shown in FIG. 1. The configuration of the electric circuits of the head section and the amplification section of the split-flow-type flow sensor apparatus is described later in detail. An upper case unit 28 containing a printed wiring board forming the electric circuit of the head section is put on the flow sensor board 21.

Figure 7:
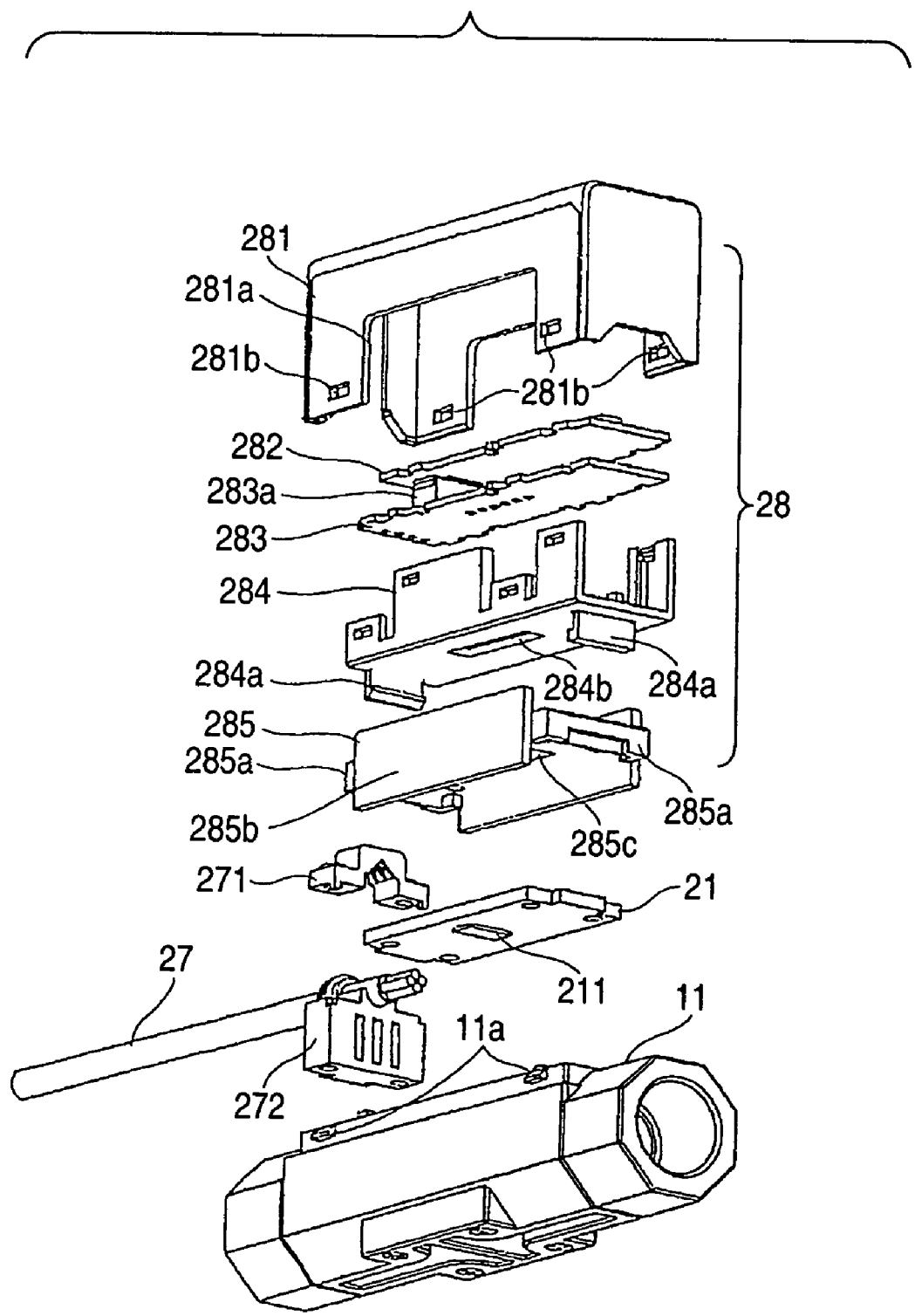
FIG. 7 is an exploded view of an upper case unit and the flow sensor board.
Figure 14:
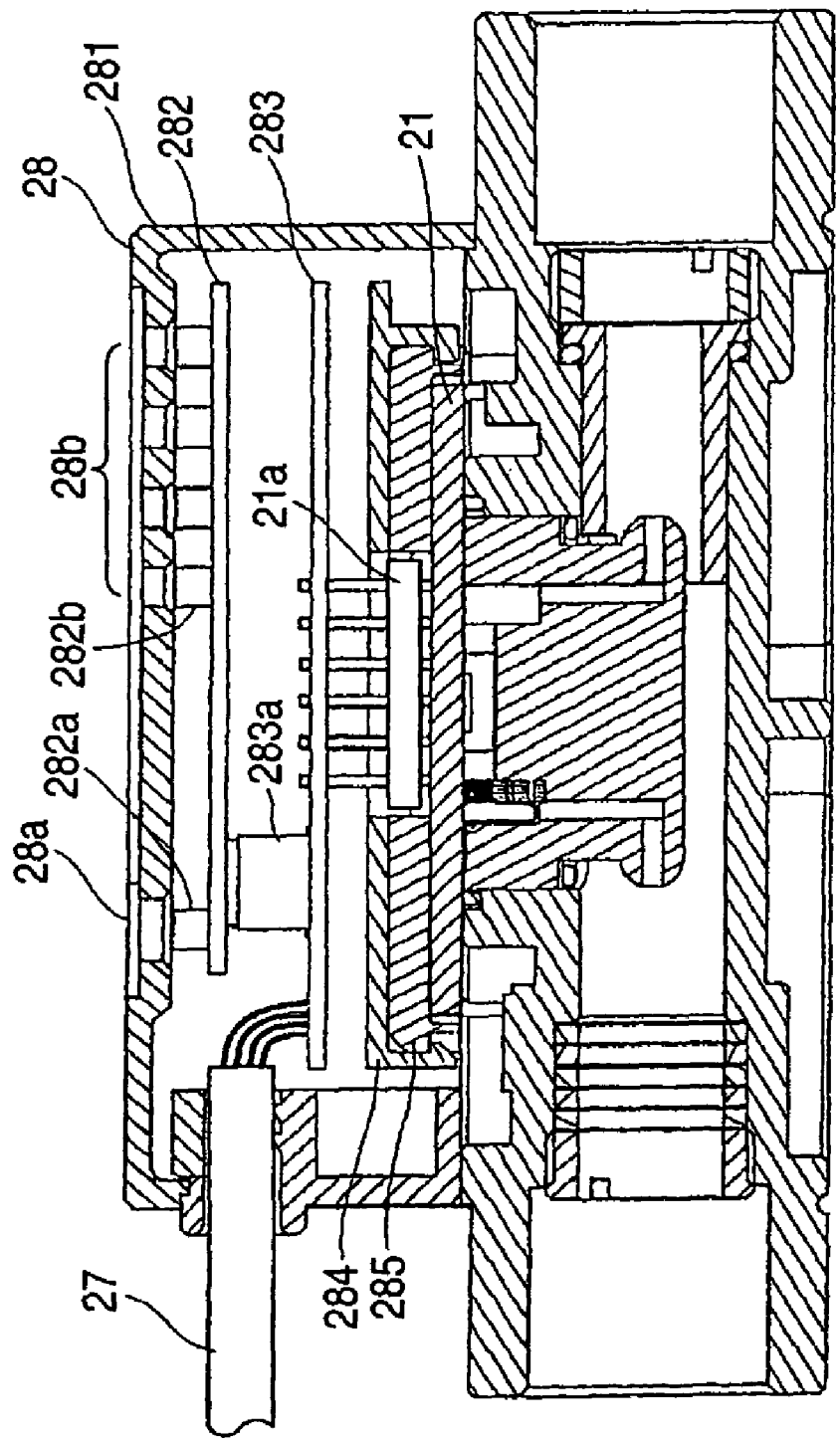
FIG. 14 is a sectional view to show the internal structure including the upper case unit of the head section of the split-flow-type flow sensor apparatus.

FIG. 7 is an exploded view of the upper case unit 28 and the flow sensor board 21. FIG. 14 is a sectional view to show the internal structure including the upper case unit of the head section of the split-flow-type flow sensor apparatus. The upper case unit 28 includes an upper case 281 made of resin, a display board 282 housed therein, a main board 283, an upper board holder 284, and a lower board holder 285. Two LED indicators 28a and 28b are provided on the top face of the upper case unit 28 (upper case 281), also shown in FIG. 1. The first LED indicator 28a is an LED indicator turned on and off under the control of the amplification section and indicates whether the current flow quantity is larger or smaller than a preset flow quantity. The second LED indicator 28*b* represents how gas flows by lighting four LEDs (light emitting diodes) in order. The speed (period) lighting the LEDs in order in response to the flow quantity is changed, whereby the operator can visually recognize the flow quantity. An LED 282*a* corresponding to the first LED indicator 28*a* and four LEDs 282*b* corresponding to the second LED indicator 28*b* are mounted on the display board 282.

Mounted on the main board 283 are circuit parts of a processing circuit of an output signal of the thermal flow sensor 211, a drive circuit of the LED indicators 28*a* and 28*b*, a circuit for communicating with the amplification section, a power supply circuit, etc. The main board 283 is connected to the display board 282 via a board-to-board connector 283*a* in one piece vertically, and the boards 282 and 283 are fixed to the upper board holder 284 made of resin. An engagement projection 284*a* projecting downward is provided at each of the end parts before and after the lower face of the upper board holder 284, and engagement parts 285*a* for engaging the engagement projections 284*a* are formed at the end parts before and after the lower board holder 285. The pair of front and rear engagement projections 284*a* and the pair of front and rear engagement parts 285*a* engage each other, whereby the upper board holder 284 and the lower board holder 285 are joined in one piece.

The lower board holder 285 made of resin has a structure shaped like a letter H in cross section, made of a horizontal plate part and both side plate parts 285*b* to enhance the strength of the lower board holder 285. To prevent pressure of gas flowing through the bypass flow passage from bending the flow sensor board 21, the lower board holder 285 is fastened to the side opening of the main flow passage member 11 with screws as shown in FIG. 5 in a state in which the lower face of the lower board holder 285 is in contact with the top face of the flow sensor board 21. The cross-sectional shape to enhance the strength of the lower board holder 285 is not limited to the H shape; for example, it may be angular U-shaped in cross section. To make the lower board holder 285 of metal capable of ensuring a sufficient strength, the shape formed only by the horizontal plate part without the side plate parts 285*b* may be adopted.

The side plate parts 285*b* also serve as parts of both side walls of the upper case unit 28. That is, a rectangular notch 281*a* is formed in a comparatively wide area of each of both side faces of the upper case 281 and the side plate parts 285*b* of the lower board holder 285 are fitted into the rectangular notches 281*a* so that the side faces of the upper case 281 flush with the surfaces of the side plate parts 285*b* of the lower board holder 285, as shown in FIG. 7. A resin sheet (not shown) is put on the whole of the side faces of the upper case unit 28 containing the side plate parts 285*b* of the lower board holder 285. Such a structure makes it possible to lessen the width of the upper case unit 28 while ensuring the areas of the boards 282 and 283 to the fullest extent possible.

As seen in FIG. 14, the electric cable 27 for electrically connecting with the amplification section is connected to the main board 283. The main board 283 and the flow sensor board 21 are electrically connected by a board-to-board connector 21*a*. As seen in FIG. 7, through holes 284*a* and 285*a* for inserting the board-to-board connector 21*a* are made in the centers of the upper board holder 284 and the lower board holder 285.

A total of four engagement holes 281*b* are made in the lower end parts of both side faces of the upper case 281, and engagement projections 11*a* corresponding to the engagement holes 281*b* are formed on the upper side faces of the main flow passage member 11. The four pairs of engagement holes 281*b* and engagement projections 11*a* are engaged with each other, whereby the upper case 281 is fixed to the top of the main flow passage member 11.

Figure 8:
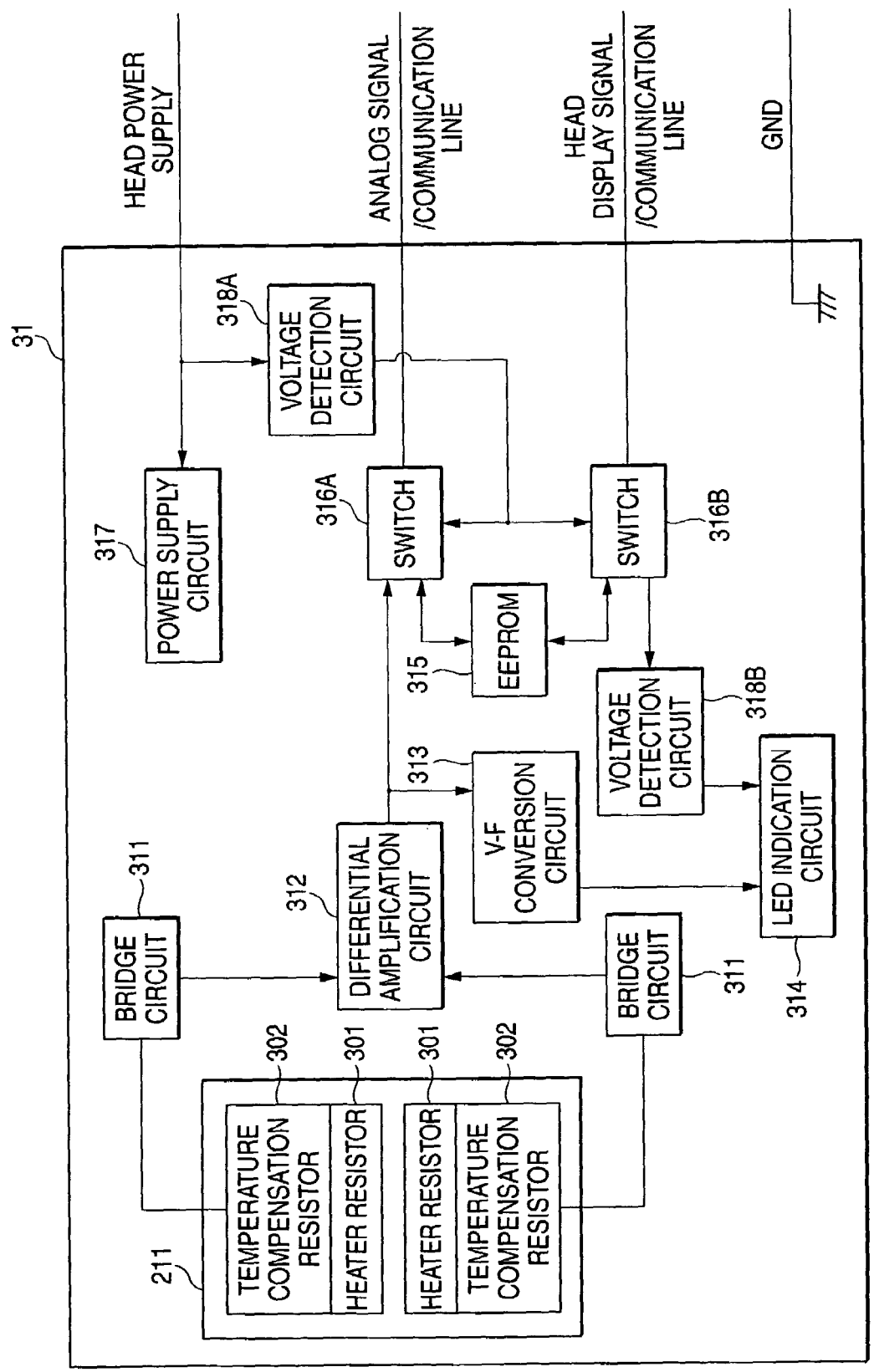
FIG. 8 is a block diagram to show the configuration of the electric circuit of the head section of the split-flow-type flow sensor apparatus.
Figure 9:
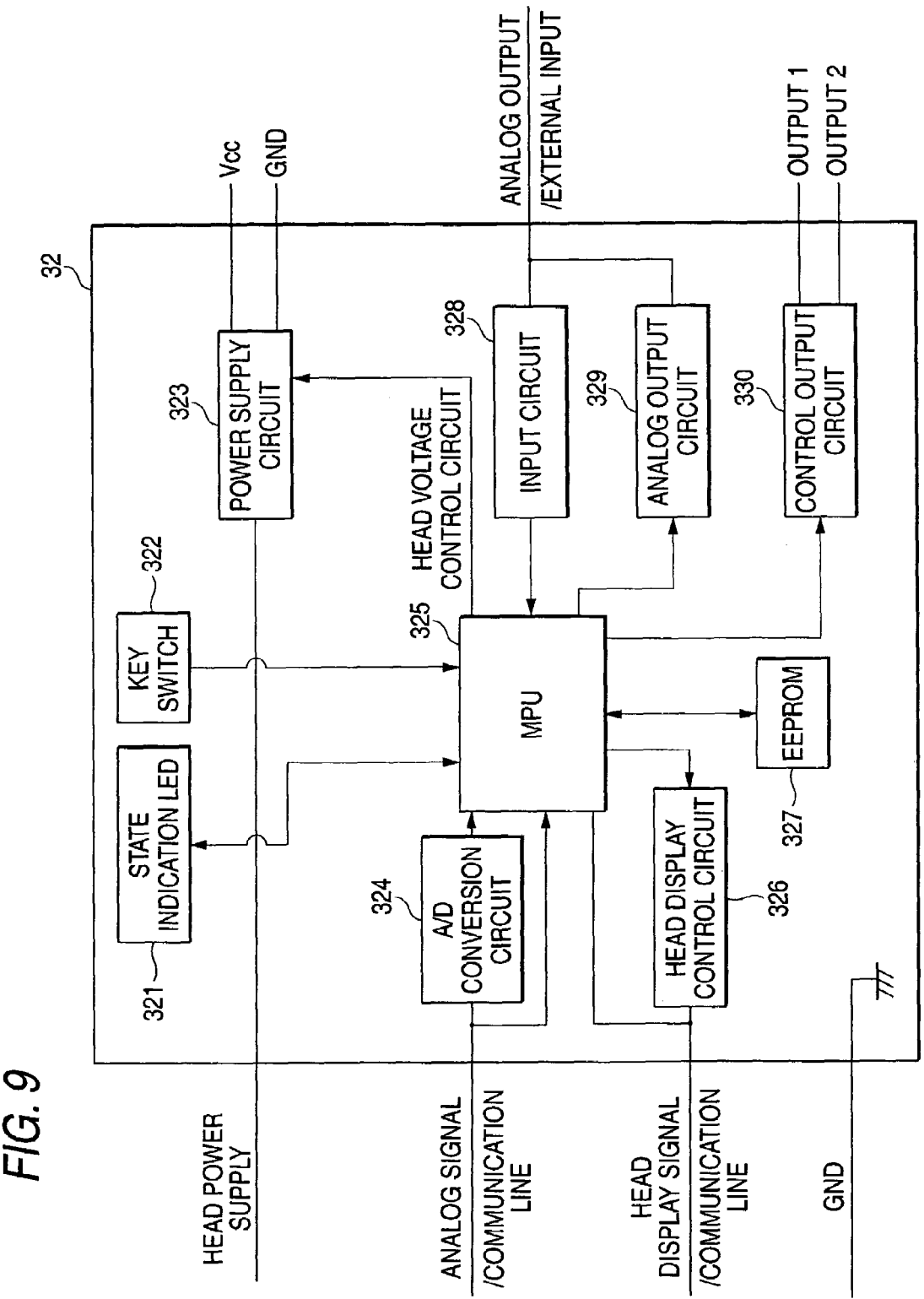
FIG. 9 is a block diagram to show the configuration of the electric circuit of an amplification section connected to the head section.

FIG. 8 is a block diagram to show the configuration of the electric circuit of the head section. FIG. 9 is a block diagram to show the configuration of the electric circuit of the amplification section connected to the head section. The electric cable 27 for electrically connecting the head section 31 and the amplification section 32 includes four electric lines, namely, a head power supply line, an analog signal/communication line, a head display signal/communication line, and a ground (GND) line. The analog signal/communication line serves both as a signal line for sending a voltage signal (analog signal) corresponding to the flow quantity detected by the head section 31 to the amplification section 32 and a digital communication line. The head display signal/communication line serves both as a signal line for controlling turning on and off the LED indicators of the head section 31 from the amplification section 32 and a digital communication line.

The head section 31 includes the above-described thermal flow sensor 211, a pair of bridge circuits 311 and a differential amplifier 312 of a processing circuit of an output signal of the thermal flow sensor 211, a V-F conversion circuit 313, a LED indication circuit 314 including a plurality of LEDs corresponding to the above-described first and second LED indicators 28*a* and 28*b*, EEPROM 315 of an electrically erasable programmable ROM device, two analog switches 316A and 316B, a power supply circuit 317, and two voltage detection circuits 318A and 318B.

The thermal flow sensor 211 includes two pairs of heater resistors 301 and temperature compensation resistors 302 each formed of a platinum thin film, and the pairs are placed apart from each other upstream and downstream. When a given electric current is allowed to flow into the upstream and downstream heater resistors 301, if no gas flow exists, there is no difference between temperatures caused by heat generation of the heater resistors 301; however, the gas flow quantity increases, the upstream heater resistor 301 is cooled as compared with the downstream heat resistor 301 and the temperature of the former is much lowered than that of the latter.

Therefore, the gas flow quantity can be detected from the temperature difference between the upstream and downstream heater resistors 301. In fact, in the thermal flow sensor 211 of the embodiment, an electric current is supplied to the upstream and downstream heater resistors 301 by the pair of bridge circuits 311 so that both the upstream and downstream heater resistors 301 become the setup temperature (resistance value). The current difference (voltage difference) between the upstream and downstream heater resistors 301 is amplified by the differential amplification circuit 312, and the provided output voltage becomes a detection signal corresponding to the gas flow quantity. The temperature compensation resistors 302 paired with the heater resistors 301 are resistors for compensating for change in the ambient temperature.

The output voltage of the differential amplification circuit 312 (detection signal corresponding to the flow quantity) is sent through the analog switch 316A to the amplification section 32 over the analog signal/communication line and is also given to the V-F conversion circuit 313. The V-F conversion circuit 313 converts the voltage signal corresponding to the input flow quantity into a frequency (period) signal and gives the provided signal to the LED indication circuit 314. Based on the signal, the LED indication circuit 314 lights the four LEDs making up the second LED indicator 28b in order in a given period. Thus, the four LEDs are repeatedly lit in order in the shorter period (at higher speed) as the flow quantity is larger.

The LED as the first LED indicator 28a included in the LED indication circuit 314 is lit or extinguished by a control signal from the amplification section 32. That is, the control signal from the amplification section 32 is given to the head section 31 through the head display signal/communication line, and is given to the voltage detection circuit 318B through the analog switch 316B. The output signal of the voltage detection circuit 318B is given to the LED indication circuit 314. The signal is also used for on/off control of the second LED indicator 28b. For example, when the amplification section 32 determines that the flow quantity is equal to or less than a predetermined value, the first LED indicator 28a is turned off by the control signal given to the head section 31 by the amplification section 32, and the second LED indicator 28b for producing flow display is also turned off.

The EEPROM 315 is used to store the proper (identification) data and characteristic data of the head section 31, and storage data is read and written by communication control from the amplification section 32. At this time, the analog signal/communication line and the head display signal/communication line are used as the two communication lines. Turning on and off the two analog switches 316A and 316B can be controlled by the power supply voltage given from the amplification section 32 to the power supply circuit 317 of the head section 31 through the head power supply line. To do this, the power supply voltage supplied from the amplification section 32 is input to the voltage detection circuit 318A, which then gives an output voltage to a control terminal of the analog switch 316A, 316B.

The amplification section 32 includes a state indication LED 321, a key switch 322, a power supply circuit 323, an A/D conversion circuit 324, a microprocessor (MPU) 325, a head display control circuit 326, EEPROM 327, an input circuit 328, an analog output circuit 329, and a control output circuit 330. The microprocessor 325 controls the whole of the amplification section 32 and gives a signal for controlling the first LED indicator 28a through the head display control circuit 326 to the head section 31. The output voltage of the differential amplification circuit 312 (detection signal corresponding to the flow quantity) sent through the analog signal/communication line from the head section 31 is converted into a digital value by the A/D conversion circuit 324 and then the digital value is input to the microprocessor 325.

The state indication LED 321 indicates the operation state of the split-flow-type flow sensor apparatus including the head section 31 and the amplification section 32. The key switch 322 is used to set the reference flow quantity value to control lighting/extinguishing the first LED indicator 28a and other operation conditions. For example, if the detected flow quantity value is larger than the reference flow quantity value, the first LED indicator 28a is lit; otherwise, the first LED indicator 28a is extinguished. The power supply circuit 323 supplies power supply voltage to the components making up the amplification section 32 and also supplies power supply voltage to the head section 31 through the head power supply line. A head voltage control signal is given by the microprocessor 325 to the power supply circuit 323 to control turning on and off the two analog switches 316A and 316B inserted into the analog signal/communication line and the head display signal/communication line of the head section 31 as described above. The power supply circuit 323 switches the voltage supplied to the head power supply line in accordance with the head voltage control signal.

The EEPROM 327 is used to store various setup values and control data. The storage data may be able to be rewritten based on data input to the microprocessor 325 through the input circuit 328 from an external machine (for example, host controller). The detected flow quantity value can be output from the microprocessor 325 through the analog output circuit 329 to an external machine. Further, two output ports for outputting a control signal from the microprocessor 325 through the control output circuit 330 to an external machine are provided. For example, the two output ports for externally outputting on/off output corresponding to (in association with) the LED indication of the head section 31 and the amplification section 32 described above can be used to output four types of 2-bit data.

Next, the advantages of the first rectification member 14 provided in the main flow passage and the second rectification member 24 provided in the bypass flow passage will be discussed additionally. The first rectification member 14 has the function of mainly uniforming the radial flow distribution in the main flow passage before diversion, namely, the flow distribution in the cross section of the flow passage. Particularly, if the shape of the pipe line connected to the upstream side of the split-flow-type flow sensor apparatus is bent like a letter L, the flow distribution in the cross section of the flow passage in the upstream side end part of the main flow passage easily becomes nonuniform. In this case, the gas flowing along the wall face of the main flow passage tends to increase and the gas flowing in the vicinity of the center in the cross section of the flow passage tends to lessen. Consequently, the gas flowing into the bypass flow passage from the entrance 121 decreases and the flow measurement result tends to be detected smaller than the actual flow quantity. As the first rectification member 14 functions, such tendency is suppressed or relieved.

Figure 10:
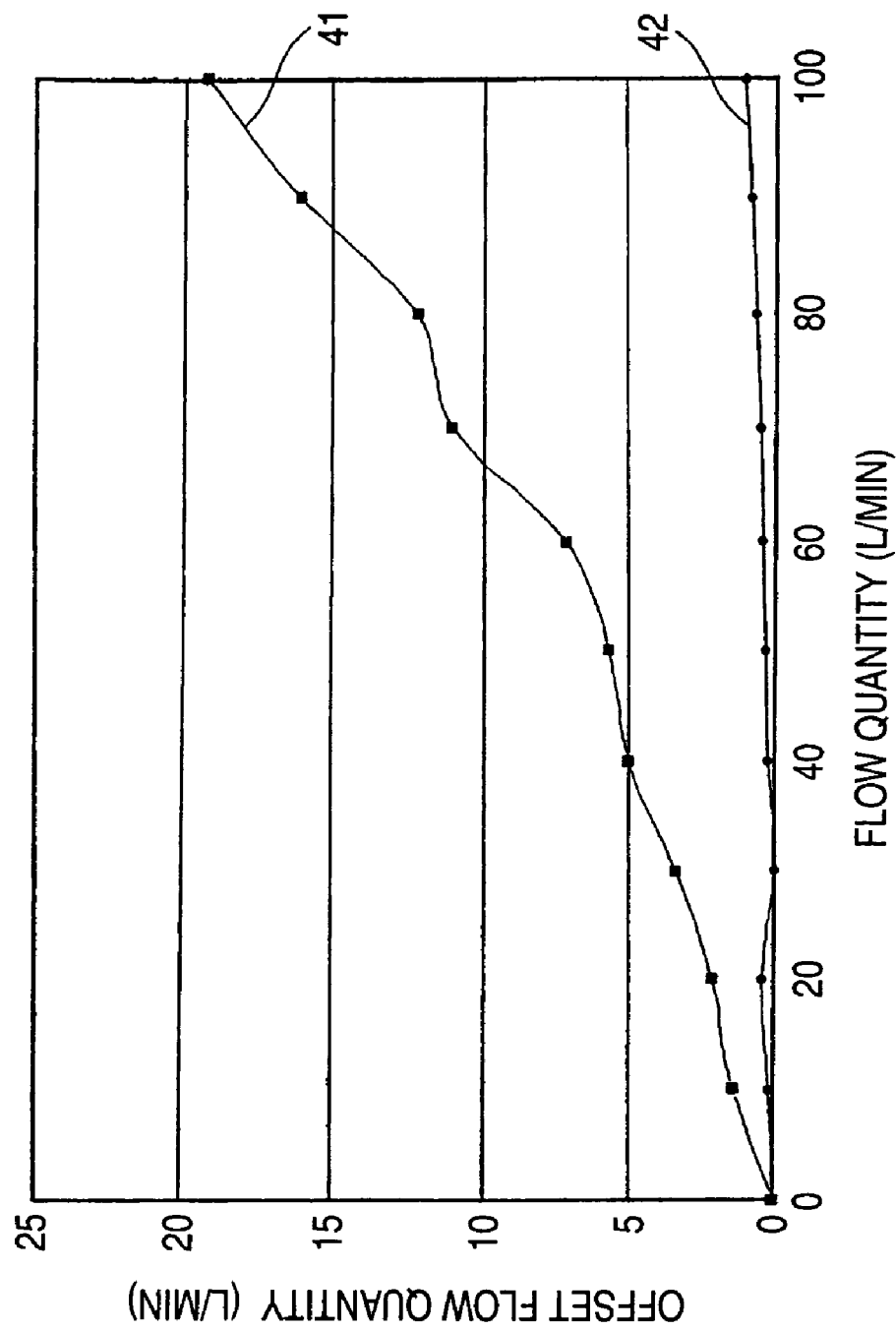
FIG. 10 is a graph to show the effect of the first rectification member.

FIG. 10 is a graph to show the effect of the first rectification member 14. The horizontal axis represents the actual flow quantity (litters/minute) and the vertical axis represents the offset flow quantity (litters/minute). The offset flow quantity mentioned here means the difference between the actual flow quantity and the detected flow quantity (smaller than the actual flow quantity) when gas is allowed to flow with a pipe line bent like a letter L connected to the upstream side of the main flow passage as described above. A curve 41 is provided by plotting the measurement values when the first rectification member 14 was not installed, and a curve 42 is provided by plotting the measurement values when the first rectification member 14 was installed.

As understood from the curve 41, when the first rectification member 14 was not installed, the offset flow quantity increased with an increase in the flow quantity and was detected smaller by about 20 litters/minute than the actual flow quantity in flow quantity 100 litters/minute. In contrast, when the first rectification member 14 was installed, as the flow quantity increased, extremely small flow quantity was maintained and the difference between the actual flow quantity and the detected flow quantity in flow quantity 100 litters/minute was less than 2 litters/minute as shown on the curve 42.

Figure 11:
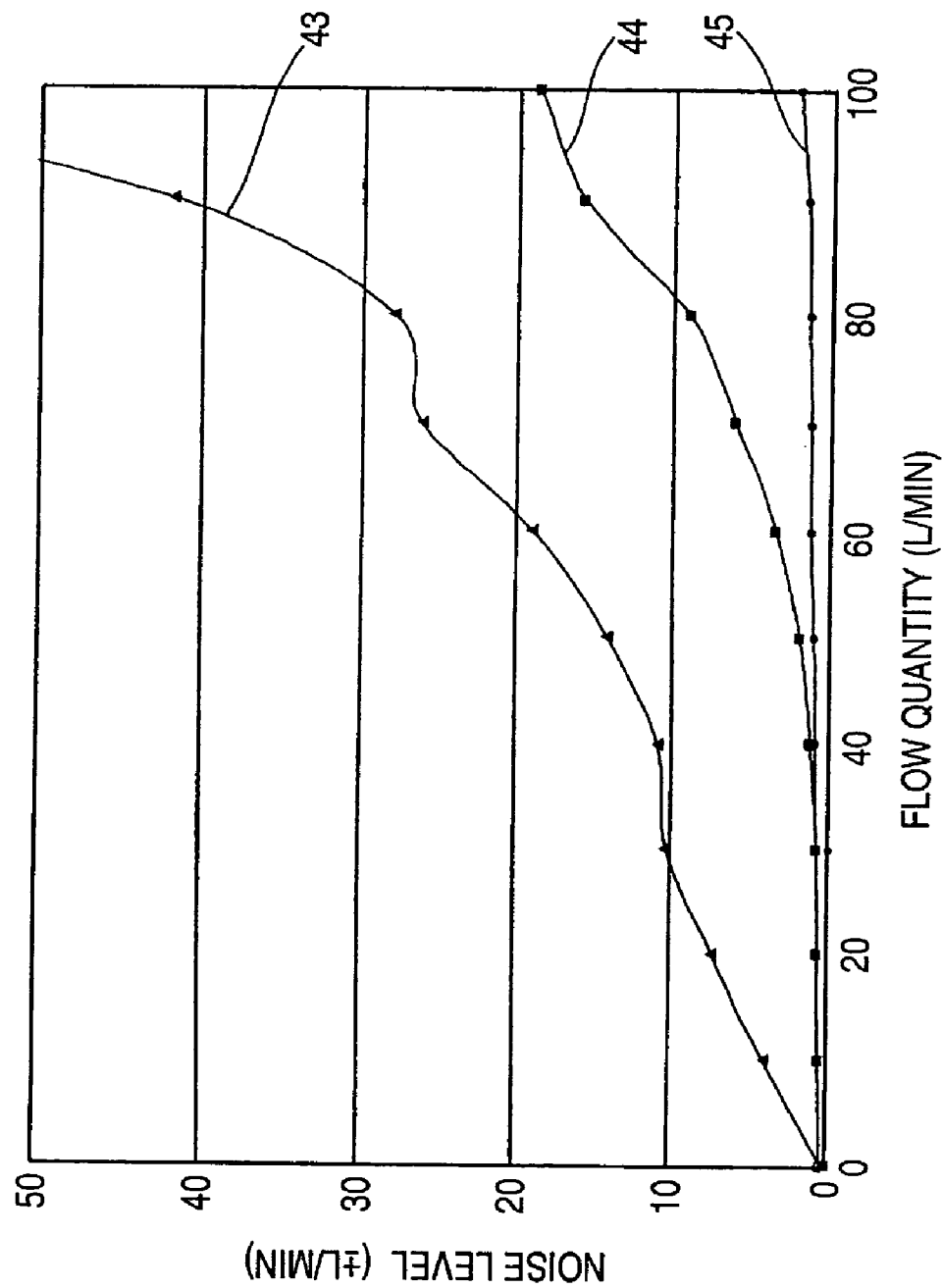
FIG. 11 is a graph to show the effect of the first rectification member and the second rectification member with respect to the noise level.

FIG. 11 is a graph to show the effect of the first rectification member 14 and the second rectification member 24 with respect to the noise level. The horizontal axis represents the actual flow quantity (litters/minute) and the vertical axis represents the noise level (±litters/minute). The noise level mentioned here is provided by converting the AC voltage component superposed on the output voltage (DC voltage)

of the differential amplification circuit 312 shown in FIG. 8 into the flow quantity. The AC voltage component occurs mainly due to gas flow disorder. If the measurement flow quantity is found as the average value for the considerable time, the AC voltage component (noise) can be removed. In this case, however, time is required until the measurement value is determined, and thus responsivity worsens. Hardware (integration circuit) or software processing for averaging is required.

In FIG. 11, a curve 43 is provided by plotting the measurement values when only the second rectification member 24 was installed without installing the first rectification member 14. A curve 44 is provided by plotting the measurement values when the first rectification member 14 was installed and the second rectification member 24 was not installed. A curve 45 is provided by plotting the measurement values when both the first rectification member 14 and the second rectification member 24 were installed.

Making a comparison between the curves 43 and 44, it is seen that the effect of the first rectification member 14 is considerable large also with respect to the noise level. However, as seen from the curve 44, when only the first rectification member 14 was installed and the second rectification member 24 was not installed, a noise level close to ±20 litters/minute was detected relative to flow quantity 100 litters/minute. In contrast, when both the first rectification member 14 and the second rectification member 24 were installed, a noise level less than ±2 litters/minute was only detected relative to flow quantity 100 litters/minute as seen from the curve 45.

Thus, it was acknowledged that the effect of the second rectification member 24 is also large with respect to the noise level. The second rectification member 24 has the function of further performing rectification upstream from the thermal flow sensor 211 in the bypass flow passage and suppressing gas flow disorder in the proximity of the thermal flow sensor 211, whereby the noise level is suppressed.

Next, a detailed embodiment and modification of the bypass module made up of the bypass flow passage member 12 and the flow sensor board 21 will be discussed. The bypass flow passage member 12 may be made by performing cutting work of a metal block of aluminum, etc., or may be made by resin molding. Particularly, to make the bypass flow passage member 12 by ejection molding of resin, preferably several points as described later are considered for the shape of details.

As seen in FIG. 4, etc., the bypass flow passage made up of the bypass flow passage member 12 and the flow sensor board 21 is made up of straight pipe parts extending linearly and bend parts bending at right angles in combination. That is, the bypass flow passage becomes a second straight pipe part B2 directed upward through a first bend part from a first straight pipe part B1 extending along the main flow passage (in a lateral direction) from the entrance 121 and becomes a third straight pipe part B3 again extending along the main flow passage through a second bend part. Further, the bypass flow passage becomes a fourth straight pipe part B4 directed downward through a third bend part and becomes a fifth straight pipe part B5 again extending along the main flow passage through a fourth bend part and leads to the exit 122. However, the bypass flow passage is not limited to the configuration as described above and can be changed whenever necessary. The numbers of the straight pipe parts and the bend parts may be increased. The bend part need not necessarily be bent at right angles and may be bent at an obtuse angle or may be bent like a circular arc (made round).

The third straight pipe part B3 in the bypass flow passage is formed by the recess part 123 formed on the top face of the bypass flow passage member 12 as described above and the lower face of the flow sensor board 21. The bottom face of the recess part 123, namely, the face opposed to the flow sensor board 21 is formed like a plane. Therefore, the third straight pipe part B3 is rectangular in cross section. In contrast, the first straight pipe part B1, the second straight pipe part B2, the fourth straight pipe part B4, and the fifth straight pipe part B5 are circular in cross section. However, they may not only be circular, but also be elliptic or rectangular in cross section.

To make the bypass flow passage member 12 by ejection molding of resin, for example, if the first straight pipe part B1 is made circular in cross section, preferably the second straight pipe part B2 is made elliptic or rectangular in cross section. That is, in the mold used for ejection molding, if both the slide pin for forming the first straight pipe part B1 and the slide pin for forming the second straight pipe part B2 are circular in cross section, it is difficult to work the abutment part. If the work accuracy is poor, a burr easily occurs in the abutment part. Then, if the first straight pipe part B1 is made circular in cross section, the second straight pipe part B2 is made elliptic or rectangular in cross section.

In more detail, a plane part is provided at least in the left side portion of the pipe wall of the second straight pipe part B2 in FIG. 4, whereby the tip shape of the slide pin for forming the first straight pipe part B1 can be made plane. Accordingly, work of the mold (slide pin) is facilitated and occurrence of a burr in the bypass flow passage formed in the bypass flow passage member 12 of a resin molded component can be avoided. To make the bypass flow passage member 12 by performing cutting work of a metal block, if both the first straight pipe part B1 and the second straight pipe part B2 are made circular in cross section, no problem arises. The relationship between the first straight pipe part B1 and the second straight pipe part B2 described above also applies to the relationship between the fifth straight pipe part B5 and the fourth straight pipe part B4.

As other considerations to make the bypass flow passage member 12 by ejection molding of resin, a recess part to hollow out a thick part may be provided to prevent molding sink in ejection molding. For example, in FIG. 4, such a recess part hollowing out a block from a side face or the bottom face may be provided between the second straight pipe part B2 and the fourth straight pipe part B4.

The upper portions of the second straight pipe part B2 and the fourth straight pipe part B4 in FIG. 4 are wide rectangular in cross section and are connected to the third straight pipe part B3, as seen in FIG. 3. The third straight pipe part B3 is placed offset from the center in the direction (width direction) at right angles to the flow passage direction, as seen in FIG. 3, because of the shape of the thermal flow sensor 211 as described above. FIG. 4 shows the cross section wherein only the portion of the third straight pipe part B3 is offset from the center.

In FIG. 4, both the mesh part 251 of the second rectification member 24 and the thermal flow sensor 211 are placed in the third straight pipe part B3 and a bend part of the bypass flow passage does not exist therebetween. Accordingly, the flow quantity just after a roughly uniform gas flow is provided by the second rectification member 24 is detected by the thermal flow sensor 211. The second rectification member 24 is provided in the beginning portion of the third straight pipe part B3, namely, just after the second bend part following the second straight pipe part B2, and the piling direction of the mesh plates 25 making up the second rectification member 24 is the direction along the main flow passage, namely, is the same as the piling direction of the mesh plates 141 of the first rectification member 14. The thermal flow sensor 211 installed on the lower face of the flow sensor board 21 projects to the third straight pipe part B3 and in this portion, the cross section of the bypass flow passage lessens. Therefore, the flow detection accuracy is improved by the squeezing effect in the portion.

Figure 15:
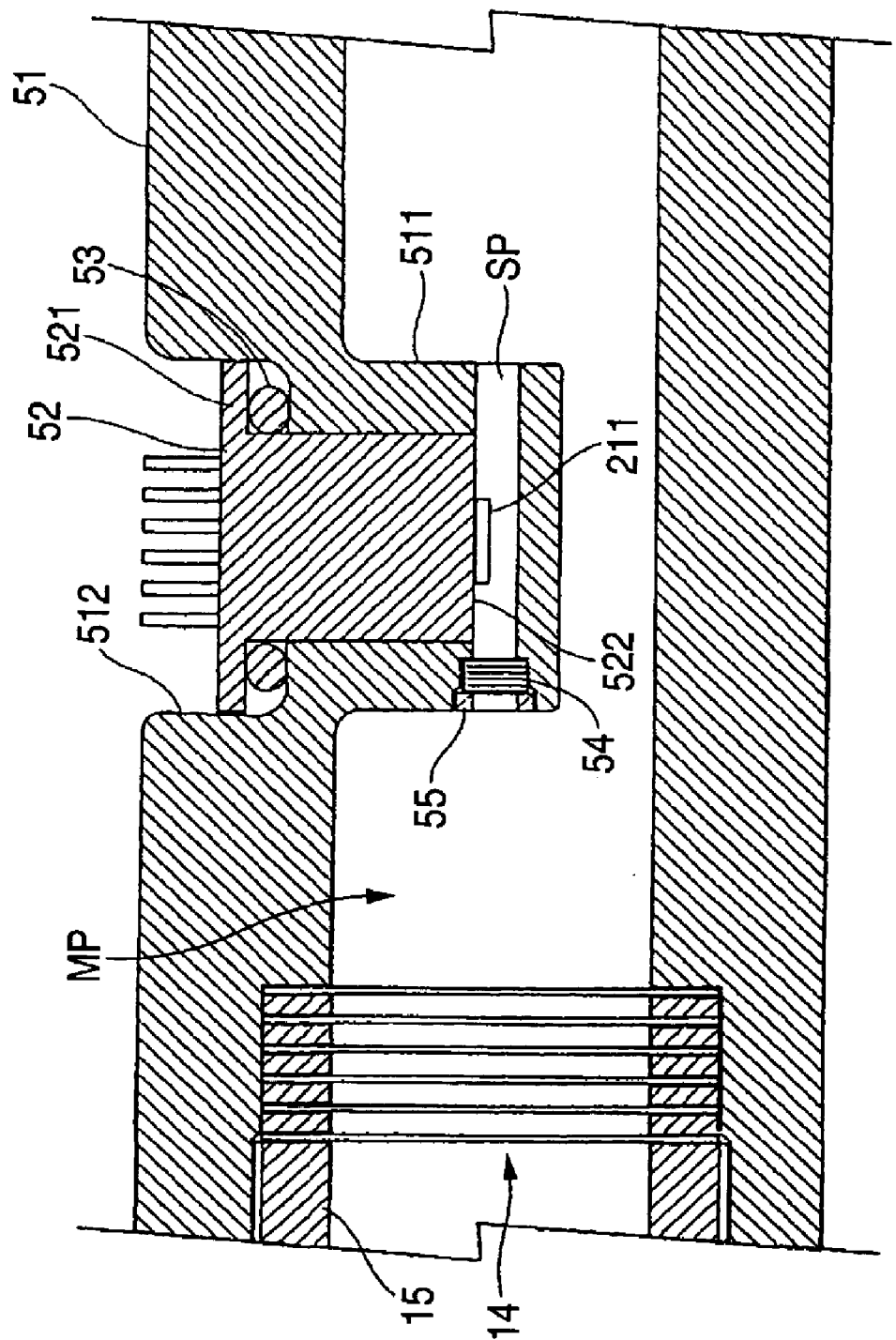
FIG. 15 is a sectional view of the main part of a head section of a split-flow-type flow sensor apparatus according to a different embodiment of the invention.

The embodiment of the invention has been described, but the invention is not limited to the specific embodiment and can be embodied by adding various changes as required. For example, in the head section of the split-flow-type flow sensor apparatus of the embodiment, the main flow passage and the bypass flow passage are formed by the main flow passage module and the bypass flow passage module of separate members and are joined for assembling, but the main flow passage and the bypass flow passage may be formed in one piece as described below:

FIG. 15 is a sectional view of the main part of a head section of a split-flow-type flow sensor apparatus according to another embodiment of the invention. In the configuration, both a main flow passage MP and a bypass flow passage SP are formed in a main module 51. A projection 511 projecting to the main flow passage MP from the upper wall face is provided for the main flow passage MP provided along the length direction of the main module 51, and is formed with the bypass flow passage SP. The bypass flow passage SP is formed so as to extend along the center axis of the main flow passage MP. A recess part 512 is formed above the projection 511 of the main module 51, and an opening is formed for allowing the bottom of the recess 512 and the upper wall face center of the bypass flow passage SP to communication with each other.

A stem member 52 for forming a submodule is placed in the recess 512 and the opening from the bottom of the recess 512 to the bypass flow passage SP. The stem member 52 is formed with a collar part 521 and an O ring 53 is interposed between the collar part 521 and the recess 512 of the main module 51. A lower end face 522 of the stem member 52 forms a part of the wall face of the bypass flow passage SP and the thermal flow sensor 211 is attached to the lower end face 522.

Figure 16A:
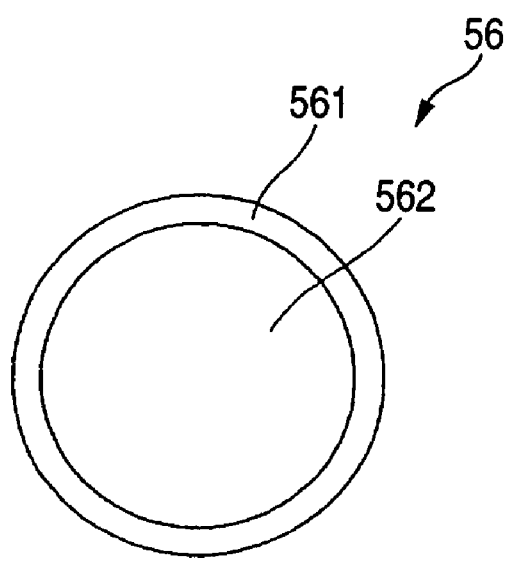
FIGS. 16A is a plan view and FIG. 16B is a side view showing an example of one of mesh plates making up second rectification member used with the head section of the split-flow-type flow sensor apparatus according to a different embodiment of the invention.
Figure 16B:
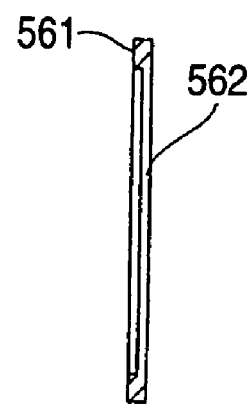

A second rectification member 54 is placed in the upstream end part of the bypass flow passage SP formed on the projection 511 of the main module 51. The second rectification member 54 is made up of a plurality of (in the example, five) mesh plates 56 as shown in FIG. 16 put on the top of each other. FIG. 16A is a plan view of the mesh plate 56 and FIG. 16B is a side view. In the mesh plate 56, a marginal part 561 of a disk made of metal is formed thicker than a mesh part 562 inside the marginal part 561 and a large number of small holes are made in the mesh part 562. For example, the thickness of the mesh part 562 is 0.1 mm and the thickness of the marginal part 561 is 0.2 mm and when the mesh plates 56 are put on the top of each other, a 0.1-mm gap is formed between the mesh parts 562 of the adjacent mesh plates 56. The second rectification member 54 may be formed using a wire net, a filter material, a honeycomb material, etc. Like the first rectification member 14 (and the mesh lock 15), the second rectification member 54 is pressed against a step part formed on the inner wall face of the upstream end part of the bypass flow passage SP and is fixed using a mesh lock 55.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A split-flow-type flow sensor apparatus comprising:
  a main flow passage;
  a bypass flow passage with a thermal flow sensor said bypass flow passage having an entrance directly disposed in a portion of said main flow passage, a first straight pipe part extending along said main flow passage from the entrance, a bent part placed downstream from said first straight pipe part, a second straight pipe part placed downstream from the bent part and being provided with said thermal flow sensor placed on a wall face of said second straight pipe part, and an exit to said main flow passage placed downstream from said second straight pipe part;
  a first rectification member placed upstream from the entrance of said bypass flow passage in said main flow passage;
  a second rectification member placed upstream from said thermal flow sensor in said second straight pipe part of said bypass flow passage; and
  a fixing member for resiliently fixing said second rectification member to said second straight pipe part.

2. The split-flow-type flow sensor apparatus as claimed in claim 1, wherein said second rectification member includes a plurality of mesh plates which are disposed adjacent to each other in a flow direction of said second straight pipe part, and
  said fixing member includes a pressing member for pressing said second rectification member in the flow direction of said second straight pipe part.

3. The split-flow-type flow sensor apparatus as claimed in claim 1, wherein said fixing member includes a deformation part disposed in a lower portion of said second rectification member which can be moved in an up-and-down direction relative to said second rectification member.

4. The split-flow-type flow sensor apparatus as claimed in claim 1, wherein said second rectification member includes a plurality of mesh plates which are disposed adjacent to each other, and
  each of said plurality of mesh plates includes an upper thin mesh part where meshes are formed in upper portions of said mesh plates and a plate part formed in a lower portion of said mesh plates and said plate part being capable of being deformed in an up-and-down direction of said second rectification member.

5. The split-flow-type flow sensor apparatus as claimed in claim 1, wherein said fixing member includes a pressing member for pressing said second rectification member in a flow direction of said second straight pipe part.

6. The split-flow-type flow sensor apparatus as claimed in claim 1, wherein said second straight pipe part is formed in a bypass flow member which has an opening at one face of said second straight pipe part and a plate which closes the opening of said bypass flow member and is provided with said thermal flow sensor, and
  said second rectification member is pressured and fixed between said bypass flow member and said plate by said fixing member.

7. The split-flow-type flow sensor apparatus as claimed in claim 6, wherein said plate has a chip of said thermal flow sensor mounted thereon, said bypass flow member is molded of a resin material so that the resin material is integrally provided to form said bypass flow passage from the entrance and the exit, and said second straight pipe part is formed in said bypass flow member and said plate has a rectangular shape in cross section.

8. The split-flow-type flow sensor apparatus as claimed in claim 1, wherein the exit is placed in said main flow passage and is directed downstream in said main flow passage, and said bypass flow passage has a third straight pipe part extending along said main flow passage toward the exit.

9. The split-flow-type flow sensor apparatus as claimed in claim 1, further comprising: a main flow passage module formed with said main flow passage containing said first rectification member; and
   a bypass flow passage module formed with said bypass flow passage containing said second rectification member, wherein said bypass flow passage module is inserted into an opening formed on a side of said main flow passage module, and the opening is sealed and the entrance and the exit of said bypass flow passage are positioned in said main flow passage.

10. The split-flow-type flow sensor apparatus as claimed in claim 9, wherein the entrance of said bypass flow passage is positioned substantially at a center of a cross section of said main flow passage.

11. The split-flow-type-flow sensor apparatus as claimed in claim 9, wherein a tip of said bypass flow passage module forming the entrance of said bypass flow passage projects in an upstream direction of said main flow passage.

12. The split-flow-type flow sensor apparatus as claimed in claim 1, wherein said second rectification member has a plurality of mesh plates which are arranged in a longitudinal direction of said second rectification member, each of said plurality of mesh plates includes a mesh part where meshes are formed and a plate part where no meshes are formed, and the mesh part is formed thinner than the plate part so that a gap is provided between the mesh parts of said plurality of mesh plates.

13. A split-flow-type flow sensor apparatus comprising:
   a main flow passage;
   a bypass flow passage with a thermal flow sensor, said bypass flow passage having an entrance directly disposed in a portion of said main flow passage, a first straight pipe part extending along said main flow passage from the entrance, a bent part placed downstream from said first straight pipe part, a second straight pipe part placed downstream from the bent part and being provided with said thermal flow sensor placed on a wall face of said second straight pipe part, and an exit to said main flow passage placed downstream from said second straight pipe part, said second straight pipe part being formed in a bypass flow member which has an opening at one face of said straight pipe part, and the wall face being a portion of a plate which closes the opening of said bypass flow member and is provided with said thermal flow sensor;
   a first rectification member placed upstream from the entrance of said bypass flow passage in said main flow passage; and
   a second rectification member placed upstream from said thermal flow sensor in said second straight pipe part of said bypass flow passage, said second rectification member being held by said plate and said bypass flow member.

14. The split-flow-type flow sensor apparatus as claimed in claim 13, further comprising a fixing member for resiliently fixing said second rectification member to said second straight pipe part, wherein said fixing member includes a deformation part disposed in a lower portion of said second rectification member which can be moved in an up-and-down direction relative to said second rectification member.

15. The split-flow-type flow sensor apparatus as claimed in claim 13, wherein said second rectification member includes a plurality of mesh plates which are disposed adjacent to each other, and
   each of said mesh plates includes an upper thin mesh part where meshes are formed in upper portions of said mesh plates and a plate part formed in the lower portion of said mesh plates and said plate part being capable of being deformed in an up-and-down direction of said second rectification member.

16. The split-flow-type flow sensor apparatus as claimed in claim 13, wherein said fixing member includes a pressing member for pressing said second rectification member in a flow direction of said second straight pipe part.

17. The split-flow-type flow sensor apparatus as claimed in claim 13, wherein said second rectification member includes a plurality of mesh plates which are disposed adjacent to each other in a flow direction of said second straight pipe part, and said fixing member includes a pressing member for pressing said second rectification member in the flow direction of said second straight pipe part.

18. The split-flow-type flow sensor apparatus as claimed in claim 13, wherein said plate has a chip of said thermal flow sensor mounted thereon, said bypass flow member is molded of a resin material so that the resin material is integrally provided to form said bypass flow passage from the entrance and the exit, and said second straight pipe part is formed in said bypass flow member and said plate has a rectangular shape in cross section.

19. The split-flow-type flow sensor apparatus as claimed in claim 13, further comprising: a main flow passage module formed with said main flow passage containing said first rectification member; and
   a bypass flow passage module formed with said bypass flow passage containing said second rectification member, wherein said bypass flow passage module is inserted into an opening formed on a side of said main flow passage module, and the opening is sealed and the entrance and the exit of said bypass flow passage are positioned in said main flow passage.

20. The split-flow-type flow sensor apparatus as claimed in claim 13, wherein said second rectification member has a plurality of mesh plates which are arranged in a longitudinal direction of said second rectification member, each of said plurality of mesh plates includes a mesh part where meshes are formed and a plate part where no meshes are formed, and the mesh part is formed thinner than the plate part so that a gap is provided between the mesh parts of said plurality of mesh plates.

* * * * *